United States Patent [19]
Fenner

[11] Patent Number: 5,842,224
[45] Date of Patent: Nov. 24, 1998

[54] METHOD AND APPARATUS FOR SOURCE FILTERING DATA PACKETS BETWEEN NETWORKS OF DIFFERING MEDIA

[76] Inventor: Peter R. Fenner, 600 Goodwin, Richardson, Tex. 75081

[21] Appl. No.: 269,951

[22] Filed: Jun. 30, 1994

Related U.S. Application Data

[63] Continuation of Ser. No. 737,147, Jul. 29, 1991, abandoned, which is a continuation-in-part of Ser. No. 367,012, Jun. 16, 1989, Pat. No. 5,095,480.

[51] Int. Cl.[6] ........................................................ G06F 12/06
[52] U.S. Cl. ............................... 711/202; 711/1; 711/201; 370/392; 370/396; 370/397
[58] Field of Search .................................... 395/427, 412, 395/491, 416, 417; 370/14, 85.9, 392, 396, 397, 402; 371/3; 711/201, 202

[56] References Cited

U.S. PATENT DOCUMENTS

| | | | |
|---|---|---|---|
| 3,979,733 | 9/1976 | Fraser | 395/325 |
| 3,987,251 | 10/1976 | Texier et al. | 370/84 |
| 3,988,544 | 10/1976 | Texier et al. | 370/68 |
| 4,168,401 | 9/1979 | Molrone et al. | 370/66 |
| 4,494,230 | 1/1985 | Turner | 370/60 |
| 4,547,877 | 10/1985 | Lehman et al. | 370/58.2 |
| 4,603,416 | 7/1986 | Servel et al. | 370/60 |
| 4,661,951 | 4/1987 | Segarra | 370/85.9 |
| 4,742,511 | 5/1988 | Johnson | 428/325 |
| 4,865,432 | 9/1989 | Andros et al. | 340/825.04 |
| 4,875,208 | 10/1989 | Furuhashi et al. | 370/94.1 |
| 4,887,265 | 12/1989 | Felix | 370/94.1 |
| 4,922,503 | 5/1990 | Leone | 370/85.13 |
| 4,953,162 | 8/1990 | Lyons et al. | 370/94.1 |
| 5,164,943 | 11/1992 | Waggoner | 371/3 |

FOREIGN PATENT DOCUMENTS

| | | |
|---|---|---|
| 255767 | 2/1988 | European Pat. Off. . |
| 2513472 | 9/1981 | France . |
| 2189112 | 10/1987 | United Kingdom . |

OTHER PUBLICATIONS

Cerone, et al., "Minimal and Almost Minimal Perfect Hash Function Search with Applications to Natural Language Lexicon Design," vol. 9, No. 1, p. 215, 1983.

Wilnai, Dan et al., "Speed Lan–Address Filtering With CAMS", Electronic Design, Apr. 26, 1990, pp. 75–90.

"LAN Interperability Study of Protocols Needed for Distributed Command and Control" by W.L. Eldon, A.L. Miller, S.L. Morgan, and B.A. Romanzo Rome Air Development Center DTIC AD–A154–003 (Mar. 1985).

"C3I Information Systems Internetwork Study" by T.C. Bartee, O.P. Buneman, J.M. McQuillan, and S.T. Walker Institute for Defense Analysis (Apr. 1984).

"Internetwork Naming, Addressing, and Routing" by J.F. Shoch IEEE Proceedings of COMPCON (1978).

"Addressing Problems in Multi–network Systems" C.A. Sunshine IEEE Proc. INFOCOM (1982).

"Multi–cast Routing in Internetworks and Extended LANs" by S.E. Deering ACM SIGCOMM (1988).

(List continued on next page.)

*Primary Examiner*—Eddie P. Chan
*Assistant Examiner*—T. V. Nguyen
*Attorney, Agent, or Firm*—Marc A. Hubbard; Munsch Hardt Kopf Harr & Dinan, P.C.

[57] ABSTRACT

To provide for fast access times with very large key fields, an associative memory utilizes a location addressable memory and look up tables to generate from a key an address in memory storing an associated record. The look up tables, stored in a memory, are constructed with the aid of arithmetic data compression methods to create a near perfect hashing of the keys. For encoding into the look up table, keys are divided into a string of symbols. Each symbol is assigned an index value, such that a modulo sum of index values for symbols of a particular key is a unique value that is used as an address to the memory storing the record associated with that key.

13 Claims, 14 Drawing Sheets

OTHER PUBLICATIONS

"The Landmark Hierarchy for Routing in very large Systems" by Paul F. Tsuchiya ACM SIGCOMM '88 Symposium on Communications Architectures & Protocols Stanford, California (Aug. 1988).

"A trade–Off between Space and Efficiency for Routing Tables" by David Peleg and Eli Upfal Journal of the ACM (Jul. 1989).

"Dynamic Hashing Schemes" by R.J. Enbody and H.C. Du in ACM Computing Surveys vol. 20 No. 2 (Jun. 1988).

"Hashing for Dynamic and Static Internal Tables" by T.G. Lewis and C.R. cook in IEEE Computer Magazine (Oct. 1988).

"Should Tables be Sorted" by Abdrew Chi–Chih Yao Journal of the ACM (Jul. 1981).

"Storing a Table with O(1) Worst Case Access Time" by M.L. Fredman, J. Komolos, and E. Szemeredi Journal of the ACM (Jul. 1984).

"Hashing in Practice, Analysis of Hashing and Universal Hashing" by M.V. Ramakrishna Proceedings of ACM SIGMOD (Jun. 1988).

"Linear Hashing with Overflow–Handling" by Linear Probing by P.A. Larson in ACM Transactions on Database Systems (Mar. 1985).

"Analysis of Dynamic Hashing with Deferred Splitting" by E. Veklerov in ACM Transactions on Database Systems (Mar. 1985).

"Partial–Match Retrieval Using Hashing and Descriptors" by K. Ramamohanarao, J.W. Lloyd, and J.A. Thom in ACM Transactions on Database Systems (Dec. 1983).

"New File Organization Based on Dynamic Hashing" by Michael Scholl in ACM Transactions on Database Systems (Mar. 1981).

"Analysis of Uniform Hashing" by Per–Ake Larson Journal of the ACM (Oct. 1983).

"Bounded Index Exponential Hashing" by David B. Lomet ACM Transactions on Database Systems (Mar. 1983).

"Reciprocal Hashing: A Method for Generating Minimal Perfect Hashing Functions" G. Jaeschke Communications of the ACM (Dec. 1981).

"Dynamic Hash Table" by Per–Ake Larson Communications of the ACM (Apr. 1988).

"Data Compression" by D.A. Lelewer and D.S. Hirschberg, ACM Computing Surveys (Sep. 1987).

"Arithmetic Coding for Data Compressioin" by I.H. Whitten, R.H. Neal, and J.G. Cleary, Communications of the ACM Jun. 1987.

"A Working–Set Coprocessor" by Milan Milenkovic, SMU Technical Report (Mar. 1989).

"An Adaptive Dependency Source Model for Data Compression" by David M. Ambrahamson, Communications of the ACM (Jan. 1989).

"A Multiplication–Free Multi–alphabet Arithmetic Code" by J. Rissanen and K. M. Mohiuddin IEEE Transactions on Communications (Feb. 1989).

Cercone, et al., "Minimal and Almost Minimal Perfect Hash Function Search with Applications to Natural Language Lexicon Design," *Marks with Applications*, vol. 9, No. 1, p. 215, 1983.

Pearson, "Fast Hashing of Variable Length Text Strings," *Communications of the ACm*, vol. 33, No. 6, p. 677, Jun., 1990.

Larson, et al., "File Organization: Implementation of a Method Guaranteeing Retrieval in One Access," *Communications of the ACM*, vol. 27, No. 7, p. 670 Jul., 1984.

METHOD AND APPARATUS FOR SOURCE FILTERING DATA PACKETS BETWEEN NETWORKS OF DIFFERING MEDIA

RELATED APPLICATION

This application is a continuation of application Ser. No. 07/737,147, filed Jul. 29, 1991, now abandoned, which is a continuation-in-part of U.S. application Ser. No. 07/367,012, filed on Jun. 16, 1989, now U.S. Pat. No. 5,095,480.

THE FIELD OF THE INVENTION

The present invention relates to associative memory systems, and more particularly to associative memory systems for handling large key spaces.

BACKGROUND OF THE INVENTION

Data communication between computers has become a standard part of worldwide networks in many areas of endeavors. These individual networks gather data about diverse subjects and exchange information of common interest among various media groups. Most of these networks are independent communication entities that are established to serve the needs of a particular group. Some use high speed connections while others use slow speed networks. Some use one type of protocol while others use a different type of protocol. Other well-known differences between networks also exist. There has been considerable effort expended in an attempt to make it possible to interconnect disparate physical networks and make them function as a coordinated unit.

Whether they provide connections between one computer and another or between terminals and computers, communication networks are divided basically into circuit-switched or packet-switched types. Circuit-switched networks operate by forming a dedicated connection between two points. Such a dedicated circuit could be represented by a telephone connected through a circuit from the originating phone to a local switching office, across trunk lines to a remote switching office and finally to the destination telephone. When that circuit is complete, no other communications can travel over the wires that form the circuit. The advantage of such circuit lies in the fact that once it is established, no other network activity will decrease the capacity of the circuit. The disadvantage is that concurrent communication cannot take place on the line or circuit.

Packet-switched networks take an entirely different approach. In such system, traffic on the network is divided into small segments of information called packets that are multiplexed on high capacity intermachine connections. Each packet carries identification that enables other units on the network to know whether they are to receive the data or are to transmit it to another destination. The chief advantage of packet-switching is that multiple communications among information sources such as computers can proceed concurrently with connections between machines being shared by all machines that are communicating. The disadvantage is that as activity increases, a given pair of communicating devices can use less of the network capacity.

A new technology has been developed that is called Internet and it accommodates information or communication networks having multiple, diverse underlying hardware technologies, or physical media protocols, by adding both physical connections and a new set of conventions. One of the problems with the use of Internet is that addresses refer to connections and not to the device itself that is sending the information. Thus, if a communication source, such as an aircraft for example, moves from one communication network to another, its Internet address must change. Specifically, if an aircraft is transmitting a particular location address code in one communication network in the Internet system and it moves to another, its Internet address must change. It is similar to a traveler who has a personal computer operating with a first communication network. If the computer is taken on a trip and connected into the information system after reaching the new destination, a new location address for the computer must be obtained for the new destination. It is also similar to moving a telephone from one location to another. A new telephone number must be assigned to the telephone at the new location. The telephone cannot be reached at the new location with the old number. Further, when routing a signal from one station to another through a plurality of nodes forming multipath connections, the message format contains a destination location address that is used to make the routing decisions. When the system has multiple addresses, the route taken by the packets traveling to a particular station address depends upon the location code embedded in the station address.

Thus, two problems occur in such message communication networks. The first is the requirement to change the address code of the communication source when it is at different locations in the network and the second is routing the message to the receiver if the address has changed. It can be seen, then, that with the presently existing system, if host A transmits a message to host B with a specific location code, by the time the message arrives at that location, host B may have moved to a new information processing network and changed its location code to conform to the new system and thus could not receive the message transmitted by host A. Host A must know that host B has entered the new information processing system and then must change the format of the new location address in order to contact host B.

The present system overcomes the disadvantages of the prior art by simply assigning a fixed, unique and unchanging identification code to both host A and host B. As host B enters into a new network access system, it transmits its identification code to the nearest node and all of the nodes interconnecting all of the disparate networks each store, with the unique identification code of host B, the address of those nodes which can communicate with host B so that a path can be completed through the nodes between host A and host B.

In the prior art, hierarchical logical routing is used to address highly mobile end-systems (computers on ships and aircraft, etc.) that are simultaneously connected to multiple communication paths and employ multicast message traffic. Hierarchical routing schemes have great difficulty solving this combined set of problems and a new approach must be used to overcome the difficulties in using hierarchical routing to meet the user's diverse requirements.

Further, in the prior art, a logical network address of larger than 32 bits was too large to be used as a directory access method to locate a receiver at a location address specified in the message format. Specialized hierarchical address structures which embed network location information have been employed to reduce the size of the access index to the routing table and also to reduce the size of the routing table. This approach couples the address structure to the Internet routing software design.

There are various "hidden assumptions" of hierarchical addressing. These "hidden assumptions" are (1) the processing load of the router CPU increases as the size of the routing table increases and (2) computer memory is a scarce and expensive resource. The present invention overcomes the first of these problems while computer memory technology has addressed the second problem by making very large memories cost effective.

Traditional approaches for designing a network address structure have either been intimately entwined in the design of efficient routing look-up tables or assigned by a central authority such as ARPANET. Neither of these approaches gives much if any thought to the needs, desires or ease of use of the group which must make operational use of the system. In an age of fourth generation database languages and high level compilers, network addresses are basically hand-coded in low level language. Addresses and address structures are difficult to change as a mobile end-unit moves from one communication network to another. Experts are often required to ensure that operational equipment is properly integrated into the system. ISO (International Standards Organization) addressing provides a basis for a much better approach but the overall design and administration of a network addressing structure must be elevated to an easily supported, user friendly, distributed architecture to effectively support the user's long-term needs.

Traditional directory access methods, whether for Internet routing, databases or compiler symbol tables, fall into three basic categories:

(1) Sorted Tables. Keys are sorted by some rule which allows a particular search strategy (e.g., binary search) to locate the key. Associated with the key location is a pointer to the data.

(2) Tree Structures. Parts of the key field are used to traverse a tree data structure to a leaf node which holds the data or a pointer to the data.

(3) Hashing. Some arithmetic function is applied to the key which compresses the key field into a chosen integer range which is the initial directory size. This integer is the index into the directory which usually contains a pointer to the data.

Each of these techniques has advantages and disadvantages when applied to the Internet routing table access design. Sorted tables provide the potentially most compact storage utilization at the cost of having access computations which grow with the number of addresses (keys) active in the system. Computations for sorted tables grow proportional to the log of the number of keys plus one. Using sorted tables, the router processing will slow down as the number of active addresses increases. But the desirable result is to make computation independent of the number of active addresses. It has been theorized, without providing a method, that a scheme to access sorted tables could exist which always allows access in two probes. To date, no methods have been proposed which approaches this theoretical result.

Tree data structures have been widely employed for directories, particularly for file systems, such as the UNIX file system where larger amounts of auxiliary disc storage is being managed. Trees offer access times that are proportional to the length of the address (key). Trees trade off memory space for processing load. More branches at each level decreases the processing but uses much more memory. For example, a binary tree uses two locations at each level for each bit in the address field for which there is an active address. The binary tree processing of an eight bit octet requires eight memory accesses as well as unpacking the bits from the octet. On the other hand, processing a 256 way tree takes one memory access using the address octet as an index at each level. A 256 way tree requires 256 locations at the next level for every different octet active (a valid value) at the current level. An address of six octets with ten valid octet values in each octet position would require $256 \times 10^6$ (256 million) locations, rapidly reaching an unrealizable size on current computer equipment. With current realizable computer memory sizes, pure tree structures do not appear to offer a viable structure for real time, address independent directory access method.

Hashing has often been used over the last several decades to create directories where fast access is desired. One system uses a multi-level hashing scheme as the file system directory structure. The Total database system is based on hashed key access. Many language compilers use hash tables to store symbols. Hash table schemes have good average access costs—often a single access, but can degrade drastically when the table becomes too full or the hashing function does not perform a good job of evenly distributing the keys across the table. Some techniques called "linear hashing" and "dynamic hashing" have provided the method of expanding the hash table when a particular bucket becomes too full instead of using the traditional linked list overflow methods. These techniques generally require about 40% more space than the number of active addresses (keys) to achieve single access speed without employing overflow methods.

All general hashing techniques use a variation of several common randomizing functions (such as dividing the key by a prime number and using the remainder) to "compress" the key field into a much smaller integer index into the hash table. Hashing functions have traditionally been viewed as one-way, randomized mapping of the key set into the hash space. The index computed by the hashing function could not be used to reconstruct the key. If for a particular hash function there exists a reciprocal function which maps the index to the unique key which generated the index, then the compressed keys could be stored in the directory.

The present invention overcomes the disadvantages of the prior art by considering a flat, as opposed to hierarchical, logical routing address space with unique identifiers assigned to each transmitter and receiver to vastly simplify the modern communication problems of addressing highly mobile end-systems which are simultaneously connected to multiple communication paths and employ multicast message traffic.

Further, the present invention employs a reversible arithmetic code compression technique to reduce the logical network address of up to 128 bits to a unique integer value which preserves any hierarchical ordering of the network address.

Also, the present invention employs dynamic hashing and memory allocation techniques to automatically adjust the size of the routing table directory and routing records to accommodate the number of end-system addresses currently active in the communication system. These techniques provide a selection of approaches to allow graceful degradation of the routing efficiency when the memory available for routing tables is full.

Finally, the system improves over the prior art by using a message format that is structure independent of the location of the destination of the message receiver.

Arithmetic coding, when applied to addresses as known length keys, provides several advantages for table look-up when the addresses are known or can be learned in advance as they are in communications applications. The proposed arithmetic coding routing table design provides direct support for mobile, multi-homed, shared network end-systems employing multicast and unicast messaging while minimizing the effects of the "hidden assumptions" that have lead to reducing the routing table size by embracing hierarchical routing schemes.

First, the identification encoding parameter tables are easily constructed by counting the occurrence of a particular symbol value and the accumulative distribution over all octet occurrences. That is, the tables are scaled to the statistical occurrence of each octet value. When a "bucket" overflows, dynamic hashing approaches can be used to expand the directory or parameter tables.

Secondly, arithmetic coding can be constructed to operate on each symbol position in the address field as it arrives, allowing processing to begin as soon as the first address symbol arrives.

Thirdly, arithmetic coding preserves the hierarchical (left to right precedence) of the ISO addresses being encoded. This is desirable if an Internet router only has knowledge of the network address but the Internet header carries the full destination address of a succeeding system node.

Finally, a constant known set of computations is required for each symbol of the address field independent of the number of address symbols or the number of active Internet addresses.

These features make the arithmetic coding used herein an ideal candidate for the routing table directory structure that is independent of a location address in a router, gate way or end-system.

The present invention provides a very fast, automatically expandable, source filtered Internet routing scheme totally independent of the internal logical or physical structure of the network addresses in the message format that it is routing. Addresses are just unique identification numbers represented by a string of symbols of known length. Each Internet router learns the location of these numbers within the network from the Internet protocol traffic, from the source addresses of the packets it receives, and from a network management protocol.

Address independent routing tables provides the following direct benefits:

They provide a very fast routing table access scheme that is capable of supporting fast packet switch designs for very high speed media such as FDDI (i.e., routers which begin the outbound transmission of the packet as soon as possible after receiving the Internet header and before the whole packet has been received).

They allow source address filtering for efficient multicast operation and security partitioning of the network.

They allow independent automatic generation of network addresses from a user name space by a network name service. This facilitates using the same Internet software in disconnected networks with different addressing authorities and different address structures.

They allow for orderly expansion, restructuring and redesign of the user name space without changing the Internet code or table structure.

They reduce initial system procurement and logistic support costs because no special coding is needed for different networks.

They reduce life cycle system costs because the Internet routers automatically adapt to network changes and they can be expanded without routing table modification.

The present invention combines arithmetic coding with dynamic hashing to provide a very high speed method and system for detecting the 48 bit physical addresses in a Media Access Controller (MAC). The present system guarantees the acceptance or rejection of a frame. This technique always performs address detection functions within the transmission time of the address field plus a small fixed number of octet clocks depending on the logic implementation chosen. Specifically, the present system provides the following features: (1) variable length addresses with no known internal structure and processed with a number of memory accesses and a processing time proportional to the number of octets in the address field; (2) the size of the routing tables is directly proportional to the number of active addresses known to the router and within the practical limits of currently available microprocessing systems; (3) and the computational operations required to access the routing table for any address is linearly proportional to the length of the address field and these computations are reasonably performed by currently available microprocessor systems.

SUMMARY OF THE INVENTION

Thus the present invention relates to a system for routing a message between a source and a destination and which utilizes a message format that is structure-independent of the location of the message destination, said system comprising at least a first signal transceiver device having only a first fixed unique identification code wherever the transceiver device may be located; at least a second signal transceiver device for communicating with the first transceiver device and having only a second fixed unique identification code wherever the second transceiver device may be located; and routing nodes for coupling a transmitted signal from the first transceiver device to the second transceiver device at an unknown physical location within the system using a routing message format containing only the first and second transceiver fixed unique identification codes and addresses of the routing nodes with a message format that is structure-independent of any transceiver location code.

Another aspect of the invention is an apparatus and method for implementing a routing table directory to provide for fast access times to look up routing information. This apparatus is an application of a novel associative memory utilizing arithmetic coding to associate a key presented to the memory with a record stored in the memory, but has a very-wide range of applications in many different types of data processing systems. The associative memory includes an index table stored in memory and a record memory for storing the records of data. The index table is constructed such that each symbol of a key, a key being divided into a string of symbols and each symbol being defined by its position within the key and its value, addresses an index value in the index table memory. These index values are assigned such that the sum of index values for a given key is a unique value that is used to address the record memory. Several methods and apparatus are disclosed that permit random assignment of index values to new keys as they are presented, as well as for keys that are presented in sorted order for addition to the memory.

BRIEF DESCRIPTION OF THE DRAWINGS

The present invention will be more fully understood in connection the accompanying drawings in which.

DETAILED DESCRIPTION OF THE DRAWINGS

Figure 1:
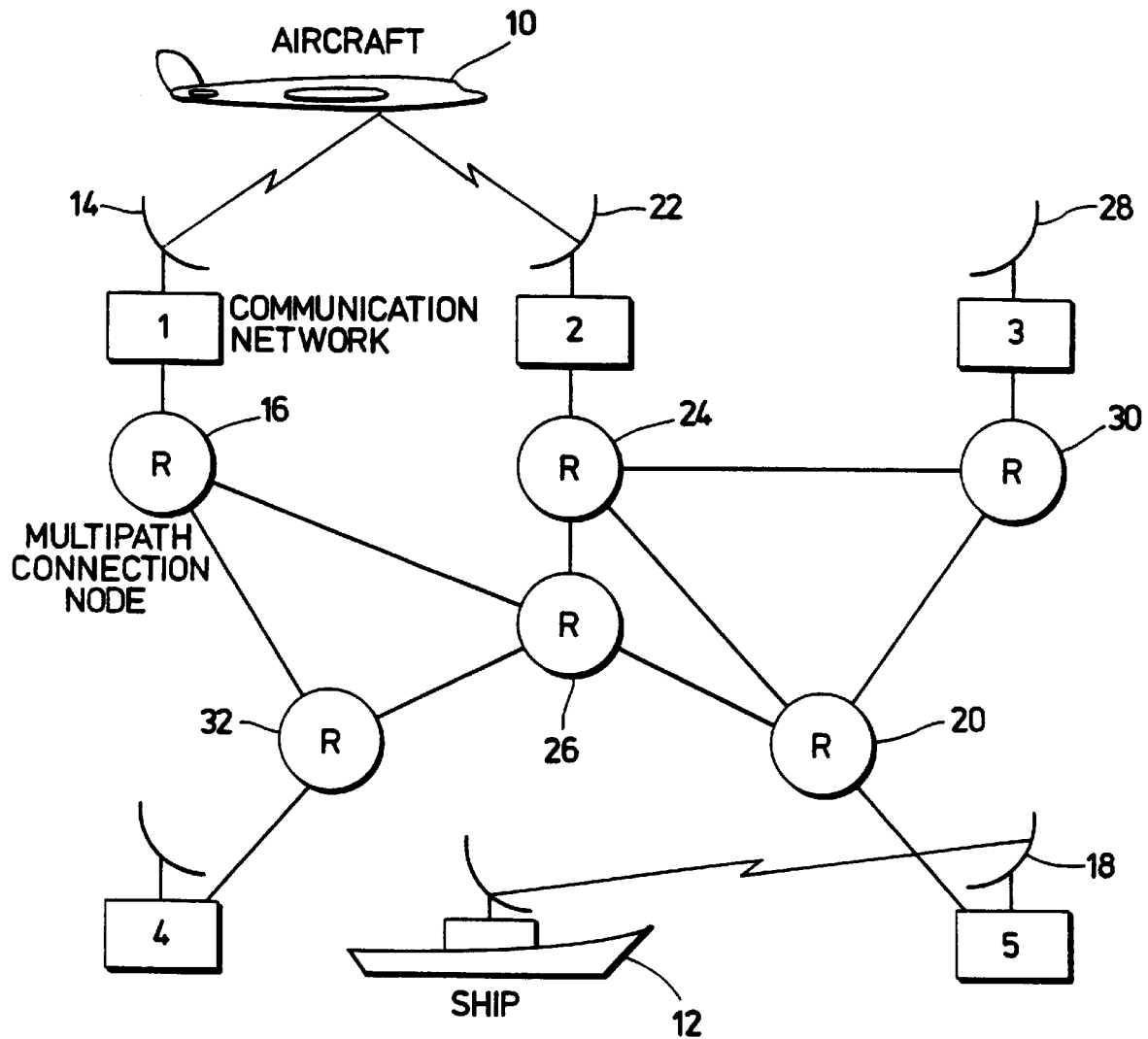
FIG. 1 is a general diagrammatic representation of an Internet communication system that, as used in the prior art, uses information handling nodes and network addresses for each host that must be changed as the host moves from one communication network to another thereby requiring a complex and cumbersome system to enable data communication from a message transmitting host to a system receiving host; when modified by the present invention, the system of FIG. 1 enables a message routing system using a message format having an internal logical or physical structure that is totally independent of the message receiving host location address.

There are many communication networks existing today which are independent entities with respect to each other such as shown in FIG. 1. Each system 1–5 uses a particular hardware technology appropriate for its own communication problems; some use high speed networks; others use slower speed networks to interconnect machines. There are long haul networks and local area networks (LANS). There are shared media networks such as ETHERNET, TOKEN RING, TOKEN BUS, FDDI and the like, each of which has a different physical media protocol. Each of these network information systems may have its own protocol for handling information within the system.

When electrical wires or cables are used to couple shared media networks, the size of the net is limited by signal attenuation to a few hundred meters; thus, the name Local Area Networks. There is no reason to limit the area of coverage other than the restrictions of the media itself. With the increased use of fiber optics, the span of these shared media networks is expanding to several kilometers and eventually will be able to span the entire continent.

In the prior art, when an external device or host such as an aircraft 10, ship 12 or other receiver/transmitter (transceiver) station is communicating with anyone of these systems 1–5, it must have an identification of its own which is recognized by the protocol of the system with which it is communicating. In such systems, if aircraft 10 wishes to communicate with ship 12, aircraft 10 must transmit into the system, among other things, a fixed address of the message receiving ship 12. The protocol of the system can then use the address information to route the message through the system to the ship 12 at the address indicated.

However, when a host passes from one communication system to another, the address code of that host must be changed to be conformed with or admitted to the new communication system. Thus, if a host passes from an FDDI to an ETHERNET system, the address code of the host must be changed in order to enable the new system to accommodate it. This change may require a great deal of manipulation of data within the system and require expensive additional equipment to enable the appropriate changes to be made. Further, by the time one host (ship 12) sends a message to the last known address of the moving host (aircraft 10), the moving host may have entered the range of a new communication network and have a different address code thereby causing a problem in receiving the message sent with a network dependent address from the message sending host.

The present invention modifies the system of FIG. 1 to overcome the disadvantages of the prior art by allowing each host to have a fixed unique identification code instead of an address code which changes to identify itself with whatever communication network it may operating. With the present invention, if host A passes from a first communication network system to a second network system (as for instance aircraft 10 flying from communication network 1 to network 2) host A may be located by host B (ship 12) who simply transmits into the communication routing system the unique identification code of the host A with which it desires to communicate. It does not know where in the system, or in a plurality of interconnected communication systems, the host A is located.

The interconnecting systems shown in FIG. 1 include a plurality of nodes 16, 20, 24, 26, 30 and 32 forming multipath connections between the plurality of network communication systems 1–5. The nodes can interface with each other even though they are in different communication systems simply by using protocols and procedures that are well-known in the art.

If aircraft 10 desires to contact ship 12, it simply transmits a message format including its own unique code and the unique identification code for ship 12 to the nearest system 14. The receiving system 14 sends the message to node 16 which checks its memory tables to determine if it has stored the address of the last node (26 or 32) communicating with ship 12. If not, it stores the unique identification code of aircraft 10. It also forwards to all interconnecting nodes, except the one from which the message was received, 26 and 32 in this case, the message including the identification code of ship 12 as well as the identification code of aircraft 10. In like manner, each of the interconnecting nodes 26 and 32 checks its memory storage tables to see if it has received and stored the identification code for either aircraft 10 or ship 12. If not stored, it stores the unique identification code of aircraft 10 and the address of the forwarding node, and forwards that information to the succeeding nodes. Thus node 26 forwards that information to nodes 20 and 24 but would not forward it to node 32 since node 32 is also coupled to node 16 which has that information. Node 20 will be updated by node 26 since it is the closest node. Eventually, ship 12 will contact its nearest node 20 coupled to communication network system 5 through radio receiver 18 to identify itself. Source node 20 has the unique identification code for aircraft 10 stored in its memory table and will store the identification code and received route for ship 12 in its memory table. Node 20 will now contact the nearest node 26 from which it received the identification code for aircraft 10 and couple ship 12 to that node. Node 26 again will check its memory bank and find the nearest node from which it had received the identification code for aircraft 10 (node 16). A communication path is thus completed between aircraft 10 and ship 12 and they can communicate with each other even though initially one did not know the location of the other in the system. It will be noted that in this case there were no specific address locations of either aircraft 10 or ship 12 in any of the message formats that were transmitted or received. They simply contained the identification code of the message source and message receiver that was stored by the nodes and the addresses of each node in the path having that information, and the information was recalled as necessary to establish communication paths between aircraft 10 and ship 12.

If ship 12 is moving and passes from the control of a first network communication system 4 to a second network communication system 5, the nearest node 32 in the first communication system 4, after a predetermined period of time, drops from its memory bank the identification code and routing information of ship 12. However, the transmission by ship 12 of its identification code to the nearest node 20 in the second communication system 5 is recorded by that node and transmitted to the other nodes throughout the interconnected system so that each node now knows the updated location of node 20 that is nearest to ship 12. In that manner, either aircraft 10 or ship 12, even though either or both are moving, can continually communicate with each other through an interconnected system of communication networks without having the specific system address of the other.

Since any given node may receive information from one or more nodes, standard protocol is used to determine the node from which the given node first received the information. That would be the closest node. If, in the event of a transmission back along that path, it was found that the closest node was for some reason out of the system, it could then pick one of the other possible routes and send the information to a different node along one of those routes.

Further, each of the nodes must be able to recognize when a message is for a single node (unicast), a group of nodes (multicast) or all nodes (broadcast). Such requirements can be accomplished by systems that are already well-known in the art.

Further, each node is an information source to some nodes and an information destination for other nodes. Thus, each node has to keep a source index table and a destination index table. See FIG. 2. When aircraft 10 attempts to contact ship 12, aircraft 10 transmits into the nearest node its own identification code as well as the identification code of ship 12. The nearest node stores the source (aircraft 10) identification code in a source index table and in a destination index table. If a node has the destination identification code stored, it also has stored the address of the node from which it received that information in both its source protection record and destination route record. Of course, it may have received that information from several nodes and the addresses of all of those nodes are stored as sources and destinations. The source protection record, when combined with the destination route record, eliminates the routes to all of the other nodes except the nearest route through the use of a buffered routing logic circuit. Thus a path is connected between the two closest nodes for carrying the packet of information from aircraft 10 to the next nearest node. This process repeats in each node until the information packet arrives at ship 12.

Referring again to FIG. 1, as aircraft 10 is detected by receiver 14, the identification code information transmitted by aircraft 10 is fed into a communication network or system 1 and node or router 16 notifies the other nodes or routers in the system of the identification code. In like manner, as receiver 18 detects ship or vessel 12, communication network or system 5 updates node or router 20 with the ship 12 identification code. It, in turn, notifies the other nodes or routers within the complex communication network or system. As receiver 22 detects the movement of aircraft 10 into its area, communication network or system 2 updates node or router 24 which then updates the other nodes or routers within the system. Node 16 no longer receives information from system 1 but now updates its information from system 2 through nodes or routers 24 and 26. As aircraft 10 continues to move, receiver 28 will detect aircraft 10 and notify router 30 through system 3. Again, router 30 notifies the other nodes or routers within the system. Node or router 24 will no longer receive its information from network 2 but will be updated through router 30 as to the identification code of aircraft 10.

The problem with such vehicle movement with the prior art system, as stated, is that each of the communication systems 1–5 are different networks and may use different types of media access protocols for operation which require the network address of the moving vehicle to be changed. Thus many communication networks service their stationary and mobile users with a wide variety of media ranging from satellite links, high frequency radio, local area networks (LANS) and dedicated point to point circuits as illustrated in FIG. 1. Shipboard LANS, including SAFENET I (IEEE 802.5 Token Ring) and SAFENET II (ANSI X.3-139FDDI), are used to support command, control, communications and intelligence in certain systems. The use of standard ISO (International Standards Organization) Internet protocols and the development of very high performance, low latency packet-switched gate ways between these networks is critical to reliable communications between mobile vehicles.

As stated, in the prior art, the aircraft 10 must have assigned to it a code representing its physical address with respect to communication system 1. Physical addresses are associated with interface hardware. Thus, moving the hardware interface to a new machine or replacing a hardware interface that has failed changes the physical address of a particular host. In like manner, as the aircraft moves from system 1 to system 2 in FIG. 1, because system 2 may operate with a different media access protocol, the coding of the physical address of aircraft 10 must be changed to meet the standards of system 2. This means that if ship 12 attempts to communicate with aircraft 10 using the physical address at the last known address location in system 1, it cannot locate aircraft 10 without a new location code because aircraft 10 has moved into a new communication system network and has changed its physical address code.

The novel system of the present invention modifies FIG. 1 to provide an Internet routing table that uses a flat logical address structure to provide fast and efficient route processing of both multicast and unicast message traffic. In the present system, the physical address structure is removed from the design and operation of the Internet routing by treating the message addresses as a symbol string without predetermined internal structure and processing them as if they are a unique identification code representing the host. This approach is made possible by employing an arithmetic code compression technique as a hashing function for the routing table access method. By managing and manipulating logical network addresses within the system, mobile end-systems can keep the same network identification code (not physical address) as they move from communication network to communication network. Similarly, group or multicast addresses may be allocated without regard to their physical network connection. Thus, considering the use of the present system with the networks of FIG. 1, aircraft 10 and ship 12 maintain the same identification code even though they move from one of the networks 1–5 to another. When aircraft 10 is in communication with network 1, node 16 notifies all of the other nodes 20, 24, 26, 30 and 32 in the system that node 16 is in contact with aircraft 10. In a like manner, when ship 12 is in communication with node 20 through network system 5, node 20 notifies the other nodes in the system that it is in communication with ship 12. If aircraft 10 moves to network system 2, node 24 updates all of the other nodes in the system and their data is changed to identify node 24 as the new node in contact with aircraft 10. This system then enables each node to store data representing the address of the last node communicating with a particular mobile vehicle and not the physical address of the vehicle. This allows communication from aircraft 10 to ship 12 throughout the various communication systems without either aircraft 10 or ship 12 being required to change network addresses as they move from access point to access point and without knowing the specific network location of the other.

Each of the nodes 16, 20, 24, 26, 30 and 32, may utilize any well-known means in the art for providing point-to-point and demand assignment access protocol message transmissions to communicate with each other. There are various systems well-known in the art which allow communication network systems using one protocol to communicate with another system using a second protocol and they will not be described here.

The present system may be utilized as a Media Access Controller (MAC) multi-way switch in each node as an electronic module which detects the physical layer node address fields of the data packets arriving from one node and uses those addresses to route (switch or bridge) the packet to another node which is a path to the physical station with a particular node destination address. The MAC level multi-way switch examines the bits which constitute the node destination address field to identify which, if any, of the nodes connected to the switch should be presented the message packet for transmission. This operation is often called "destination address filtering."

A number of shared media networks previously mentioned have been standardized for common use and inter-operation of different vendor equipment. The most common of the LAN standards are ETHERNET, TOKEN BUS, TOKEN RING AND FDDI. Each of these shared media networks sends information as a variable length sequence of bits called a packet. Each packet has a fixed number of the initial bits transmitted which are dedicated both in position and size to a packet header. This header contains a destination address field and a source address field along with other housekeeping information bits. All four of the LAN standards listed above employ the same number of bits with the same meaning for both the source and destination address fields, although the housekeeping fields are different for each.

Shared media networks operate basically in the same way. The media is shared so only one node or station (one MAC) may transmit at a time and all of the other nodes or stations listen. In order to identify the recipient of the message, a destination node address is located in a specific location at the beginning of each information frame. Each listening station examines these destination node address bits to determine if the packet is for it. The receiving station (the destination node) needs to know where to send a response to the received packet and thus the packet has source node address bits at a specific location (usually just after the destination node address). The major differences in the various LAN standards are transmission speed and the scheme each uses to guarantee that only one station at a time is allowed to transmit on the media.

The Media Access Controller (MAC) is the defined entity in each of the above-listed LAN standards which connects the computer side logical level interface to the physical media. MAC isolates the logical data stream from the physical media so the circuitry on the computer side of the MAC only deals with the header and information bits.

Thus, the MAC-level switch or bridge is an electronic module which connects similar or dissimilar physical shared media networks each of which employ identical addressing field definitions. The switch transfers information packets originating from stations or nodes on one network to destination stations or nodes on another network. If station A on a shared media network desires to send a packet to station F, then station A places codes representing "F" in the destination node address field and "A" in the source node address field of the packet header of the packet being transmitted. When the MAC of station A gains access to the shared media, it transmits the packet along with other packets it may have queued for transmission. Other connected MACs all receive the packet header and examine the destination node address field. Station F recognizes the address as his own and receives the remainder of the packet. All of the other stations on the network see that the packet is not for them and disregard the rest of the packet. Neither the source node address nor the destination node address are changed in any way.

All of the standard LANS listed above have a group addressing scheme where one station may send one packet simultaneously to many other stations belonging to the group. This feature is called multicast and takes advantage of the shared media to send the packet just once rather than having to send an individual packet to each station in the group. Suppose station A wishes to send a packet to all stations in a group identified as 110 which includes stations identified as F, G and N. Station A would then put the group "110" in the destination node address field and "A" in the source node address field. When MAC A gains access to the first network, it transmit the packet. Stations F, G and N would then detect their group address and accept the packet. Other MACs would not.

Figure 2:
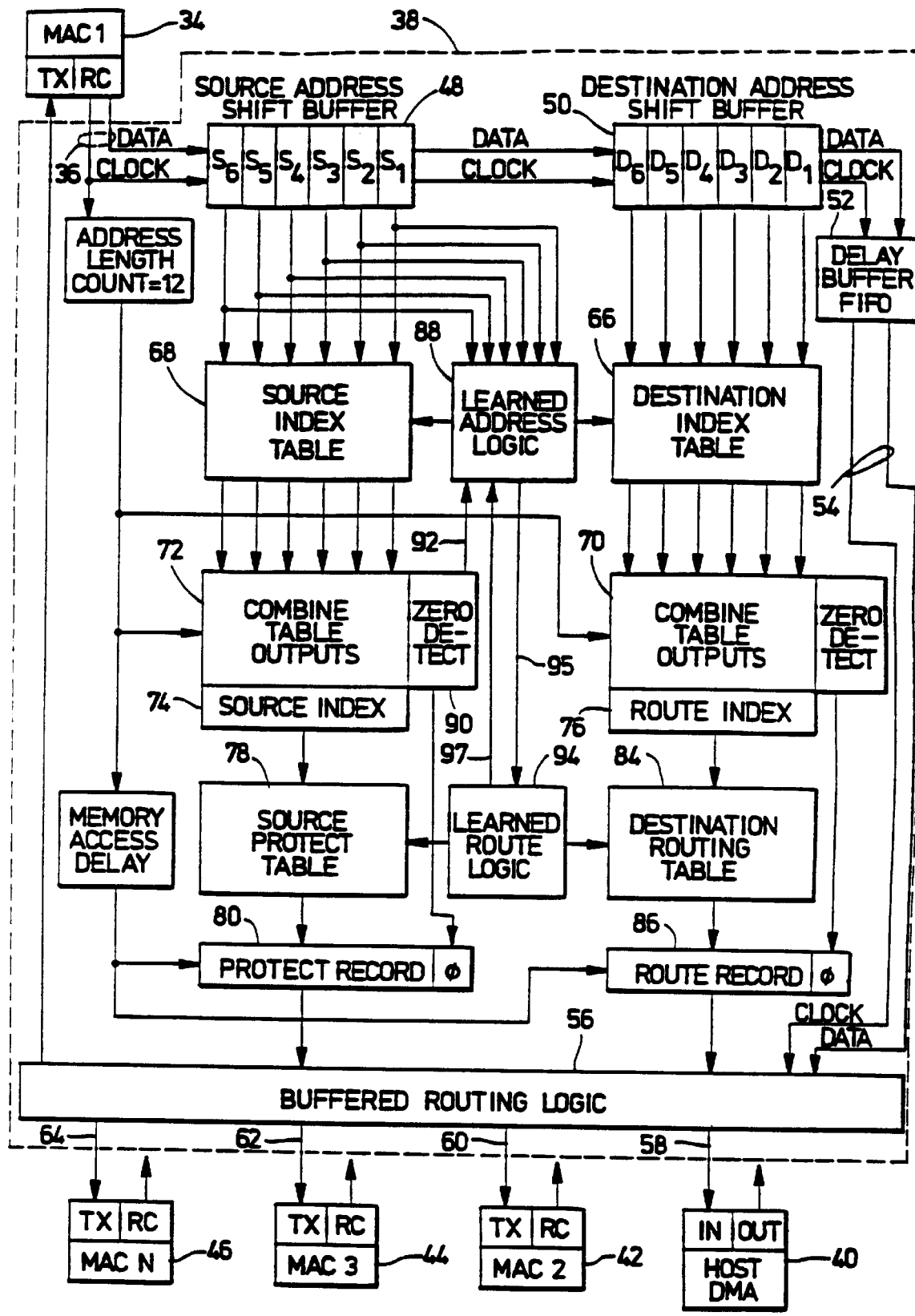
FIG. 2 is a schematic representation of the circuitry in an individual system node using parallel processing to detect the address of the next node or nodes in the system that are to receive a packet of information.

FIG. 2 is a schematic diagram of a MAC switch 38 which couples a Media Access Controller 34 at one node level to desired Media Access Controllers 40, 42, 44 and 46 at other levels.

The MAC level switch 38 shown in FIG. 2 examines the source node address field of the incoming information to determine if any or all of the other connected nodes are protected from receiving the information from the incoming source. This operation is often called "source address filtering."

Thus in FIG. 2, MAC 34 may transmit data and clock information on lines 36 to switch 38 which determines which of the destination MACs 40, 42, 44 and 46 are to receive the information. In switch 38, the data and clock signals on line 36 are serially coupled to a source address shift buffer 48 and then to destination address shift buffer 50. The data is then transferred from destination shift buffer 50 to delay buffer 52 which is a first-in, first-out device. The output of delay buffer 52 on line 54 is coupled to the buffer routing logic 56 which generates an output on lines 58, 60, 62 and 64 depending upon the destination address filtering operation performed by the switch 38.

The Media Access Controller switch 38 transmits or forwards data it receives, and accepts data for transmission as eight parallel data bits called a data octet. It processes address symbols which are a fixed number of consecutive bits from the address bit string and may be from two to any number of bits in length. One size symbol is the "eight" bit octet which is the symbol size used in the address routing table circuits presented in FIGS. 2 and 3. The number of symbols in the maximum address length to be processed for a particular implementation is a design and management decision. The examples presented in FIGS. 2 and 3 use six octets as the maximum address length, since this is the length of the IEEE standard physical layer (MAC level) address used by Ethernet, Token Ring, and FDDI. The International Standards Organization (ISO) network layer (IP.ISO 124) employs a variable length, up to 20 octets, for the source and destination address 128 and 126, as shown in FIG. 4. The designs shown in FIG. 2 and FIG. 3 would be able to process IP.ISO 124 addresses 126, 128 up to "six" octets in length. MAC 38 is responsible for aligning the data properly on the octet boundaries such that the destination and source addresses start and end on octet boundaries. Furthermore, in the LAN standards listed above, the source address field always immediately follows the destination address field and the two are always the same size. A common size for the address fields is 48 bits or 6 octets each. The address detection logic examines both the destination and source address fields represented by the octets shifted into buffer 48 and buffer 50. Six octets are in each buffer. When the twelve octets are all stored, each octet is used as an address into a 256 element index table for that address octet position. This requires six destination index tables 66 and six source index tables 68. The output of these tables (the contents of the location addressed by each octet) is then arithmetically combined in combiners 70 and 72. One method of arithmetically combining these outputs adds the six outputs of the source index table 68 to compute the source index 74. It also adds the six destination table 66 outputs to compute the route index 76. The source index 74 is used as the address into the source protect table 78 and the output of that location is the source protection record 80 which is coupled to the routing logic 82. Similarly, the route index 76 is used as the address of a location in the destination routing table 84 and the contents of that location is coupled to route record 86. The outputs of the protect record 80 and route record 86 are used by the routing logic 56 in a well-known manner to determine which destination MAC is to receive the message.

FIG. 2 may also operate as an internet level switch (router) 38, operating on IP.ISO header 124 destination 126 and source addresses 128 by shifting in the IP destination and source addresses. When aircraft 10 in FIG. 1 transmits a packet with its unique internet source identification code to one of the nodes in a network, the source address of aircraft 10 is shifted from source address buffer 48 (FIG. 2) into learned address logic 88. If that source address is a new address not stored in source index table as indicated by a zero detect, it is stored in both the source and destination index tables 66 and 68. If, after a predetermined amount of time, that information is not confirmed by a subsequent transmission, the learned route logic 94 generates an output 97 to the learned address logic 88 telling it to delete the address from both the source and destination index tables 66 and 68. This means that the aircraft 10 has moved to a different network and may be updating a new node in the new network. Subsequently, the new network node then sends a message to switch 38 in the old node and stores the source address of the new node in the route record 86 associated with the unique source address for aircraft 10. By keeping track of the source addresses of the various nodes that are transmitting information concerning a particular identification code, learned route logic 94 causes the destination routing table 84 to delete old source nodes as destinations for particular incoming data packets and add the addresses of new nodes as the destination. The source protect table 78 in each node stores the source protect record 80 (also called the MultiCast Record List 134 in FIG. 4), which has information defining a shortest path from a particular source to that node. This shortest path information is computed from the messages received from forwarding nodes using a shortest path spanning tree algorithm well known in the art. The source protect record 80 may be modified by management decision to prevent messages from a particular source identification code from being forwarded on particular paths to other nodes.

The destination routing table 84 (also called the Outbound Record Linked List 132 in FIG. 4) contains the shortest path information from this node to the current connected nodes for each unique identification code currently stored in the source and destination index tables. The current route record 86 is this shortest path information for the destination address currently in buffer 50. This information is computed from the messages received from forwarding nodes using a shortest path spanning tree algorithm well known in the art. Thus, in FIG. 1, if node 26 has received information from source nodes 16, 24 and 32, and it receives a data packet for node 20, the protect record 80 from the source protect table 78 and the route record 86 in FIG. 2, when processed by the buffered routing logic 56, will prevent node 26 from transmitting the information back to nodes 16, 24 and 32 but allow it to be transmitted to the destination node 20. Thus, the information from an incoming node or MAC 34 to a particular switch 38 may be transferred to the desired destination MAC 40, 42, 44 or 46 by the buffered routing logic 56 in the manner explained.

In FIG. 2, the address detection logic employs separate tables and arithmetic processing elements for both the source and destination address detection. While this approach allows the arithmetic processing and record table access to be relatively slow the slower elements are not sufficiently economical in price to be cost effective. Neither does the circuit of FIG. 2 utilize the fact that because the data octets arrive sequentially, they could be processed through the index look-up table and partial arithmetic computed each octet time.

Figure 3:
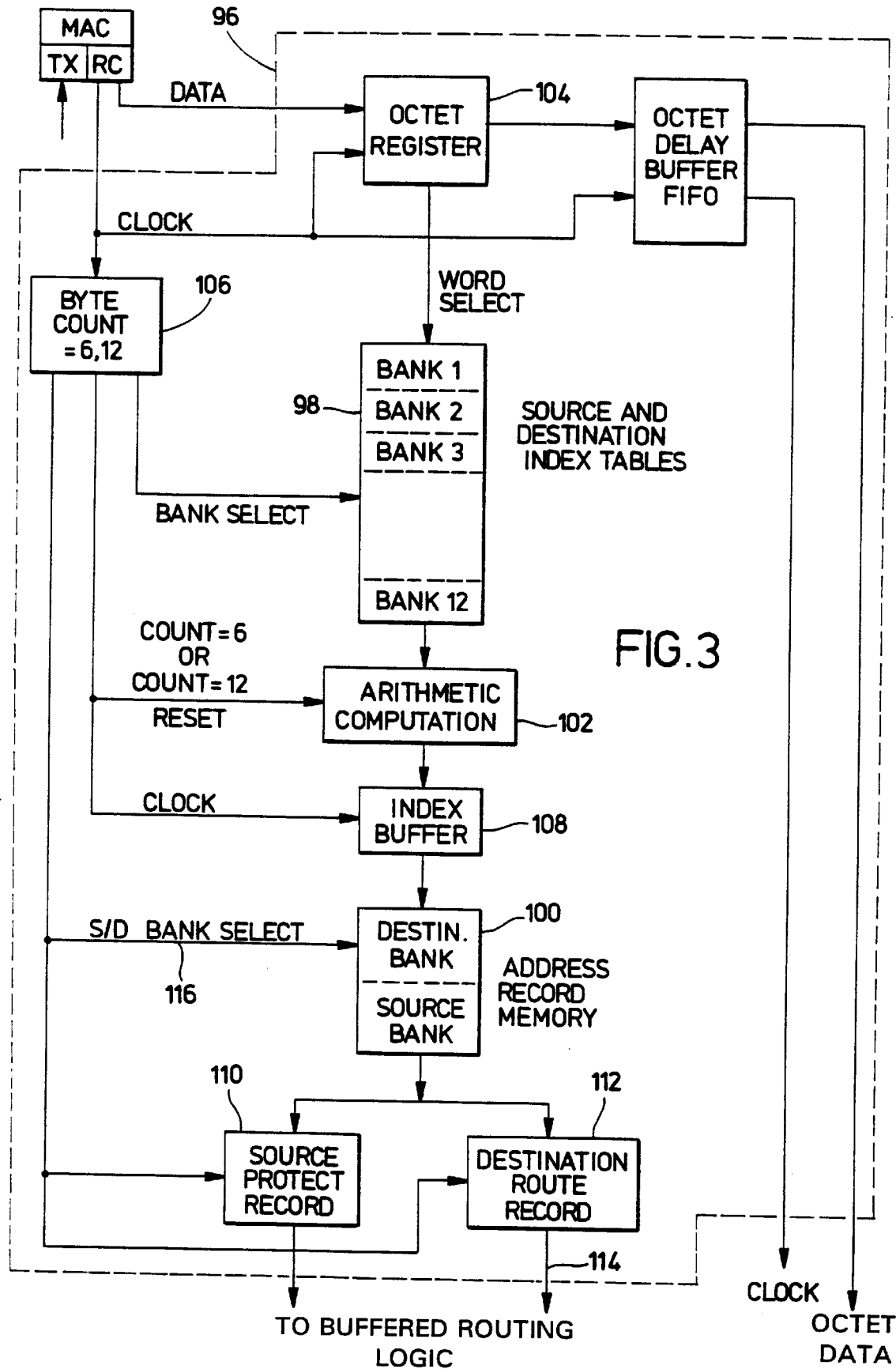
FIG. 3 is a schematic representation of an alternate circuit using serial processing at any particular node in the system to determine the address of any other node or nodes that are to receive the data packet.
Figure 4:
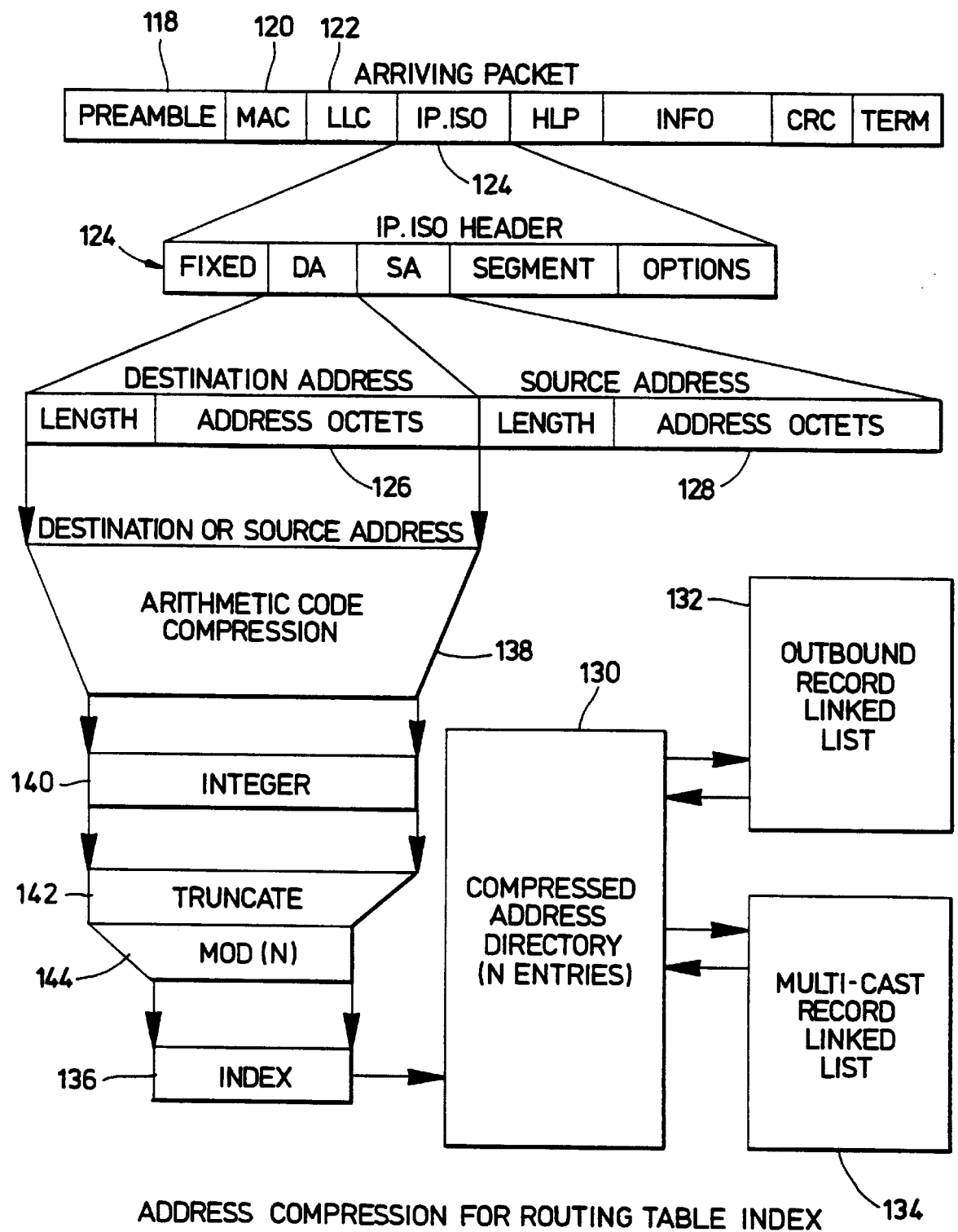
FIG. 4 is a diagrammatic representation of the circuitry for enabling the message format used by the routing system to be totally independent of the internal logical or physical structure of the address of the receiving host to whom the message format is being routed and further illustrates the manner in which a destination address or source address can be compressed to provide a usable index for accessing the address directory.

FIG. 3 is a circuit diagram of an alternate logic layout for serial processing of the incoming data by a switch 96 which is similar to switch 34. The data octets arrive sequentially and FIG. 3 discloses a logic layout which uses one bank of index table memory 98, one bank of address record memory 100 and one arithmetic computation unit 102 to accomplish both source and destination address detection. In this approach, the octet data bits are coupled serially into octet register 104 and are used as the low order address bits into the index table 98. A byte counter 106 which counts the address octets from one to twelve as they arrive in the octet register 104 is used as the high order address bits into the index table 98. From byte count one to six, the arithmetic unit 102 partially computes the final index with each output from the index table. After byte count six, the computation for the destination address mask index is complete and transferred to the index buffer 108. The arithmetic unit 102 is then reset and the six octets of source address are computed. By the time the source protection record index 110 has been computed, the data in destination route record 112 has been loaded into its output buffer on line 114. The source protect record 110 is then accessed from a second bank of the mask memory 100 using the count twelve signal on line 116 as the high order address bit. This sequential detection approach shown in FIG. 3 places special performance requirements on the index table memory and each reiteration of the arithmetic computation. That is, the access to the index table 98 and the partial computation with the table output each must be complete in less than one octet time. However, the computation is delayed one octet clock time behind the table access. Each of these timing requirements is within the available speeds of commercially available VLSI computer memory and arithmetic components. Current DRAM memories regularly run at less than 300 nanosecond access times making all but the FDDI real-time address routing practical with DRAM parts. Static RAM memories are currently available with 50 nanosecond and faster access times which makes even FDDI routing realizable. The address record memory 100 is only required to be ⅙ the speed of the index memory 98 since there are six octets between completion of the first and second record indexes. The source protect record 110 and the destination route record 112 feed into the buffered routing logic 56 of FIG. 2 to select the outbound path (MAC) for the message.

The record memory indexes may be computed by adding and accumulating the succession of six index table values to compute the mask memory index. Integer add/accumulator devices of 16 to 32 bit precision are currently available which execute a single add function in less than 80 nanoseconds. Many 16 and 32 bit microprocessors have integer add/accumulate times under 500 nanoseconds.

The address directory access circuit overview is shown schematically in FIG. 4. The arriving data packet contains a preamble 118, the first protocol layer 120 which is the Media Access Control protocol header containing the physical media destination address of the MAC receiving the packet, the second protocol layer 122 which is the logical link control and the third protocol layer 124 which is the IP.ISO Internet layer. The remainder of the packet contains the message data and housekeeping information. The third protocol layer 124 contains the unique code identifier of the receiver as the destination address data 126 and the unique code identifier of the transmitter as the source address data 128. The physical link data 120 is the actual communication channel hardware with its associated coding and modulation techniques. Physical link 120 is separated from the Internet data 124 by a combination of computer interface hardware and software called the logical link control entity data 122. Besides logically isolating the Internet layer 124 from the physical layer 120, the logical link control 122 provides a capability to multiplex packets from various higher level protocols such as TCP/IP, DECNET, and ISO/OSI over the same physical link. Each different protocol is assigned a different logical service access point (LSAP). Each LSAP is serviced by a separate set of software providing processing for each protocol as is well known with prior art. It is thus possible that one physical Internet router might be required to route packets of different protocols and therefore require two or more Internet software processes. This prospect is likely in an environment where existing networks using the TCP/IP protocols are phased over to the ISO/OSI protocols. This invention allows the same routing table access method to be employed by multiple protocols.

The IP/ISO Internet protocol data 124 provides a connectionless or datagram service between nodes on a network. Data to be sent from one node to another is encapsulated in an Internet datagram with an IP header specifying the unique global network addresses of the destination and source node. This IP datagram is then encapsulated in the logical link control 122 and physical layer protocol headers 120 and sent to a router or node. The router strips off the incoming physical header 120 and the LLC header 122. It looks up the destination and source addresses 126 and 128 in its routing table 130, selects the appropriate outbound link, or a plurality of outbound links in the case of a multicast group destination address from table 132 and reduces the plurality of outbound links using restrictions from table 134 in the case of a multicast transmission and passes the IP datagram packet to those selected channels for LLC encapsulation and transmission. With multicast datagrams, the router must determine which outbound links represent the shortest path from the multicast source to the destinations which are members of this particular group. Without this source filtering, well-known in the art, a destination station within a group might receive many copies of the datagram transported over different paths. Such multicast "flooding" wastes networks bandwidth and causes unnecessary congestion on busy segments of the network.

The ISO Internet Protocol (IP) header 124 has a number of fields. From the IP header format 124 it is apparent that the starting position and length of both the destination and source address fields are known or can be determined from the information within the IP header. The proposed routing table directory structure 130 needs only to know the length and values of the address octets to locate a unique table entry for that address. This novel directory access technique does not rely on any known structure of the address field other than knowing that it is a sequence containing a known number of symbols.

It can be seen from the discussion of FIG. 4 that the circuit therein could be used in an alphanumeric system such as, for example only, a library wherein an author and/or book name could be used to access a data table storing all books by author and title. In that case, destination address 126 in FIG. 4 would be an alphanumeric string of data representing the author's name and/or book titles. The arithmetic compression techniques illustrated by blocks 138, 142, and 144 could be used to compress the alphanumeric string as needed to obtain an index 136 which would select the appropriate address in table 130 which would contain all of the library material by author and book title. The selected information could then be obtained through routing tables 132 and 134.

Since the destination and source address are from the same network address space, they have an identical form and can use the same directory. Source addresses must be individual nodes and cannot be group addresses. To constrain the Internet overhead, the initial versions of the ISO Internet have been restricted to 16 octets maximum. This is a huge number of possible addresses on the order of $10^{36}$ and should be more than adequate for many years of global Internet operation.

Routing is accomplished by maintaining a routing table directory 130 at each node in the network as is well-known in the art. These tables are indexed by the destination and source address and contain information indicating which outbound communication links reach the destination node or nodes in the case of a multicast group address. The Internet routing task or program accesses the table 130, gets the outbound route information, analyzes the route information and queues the packet for transmission on one or more of the outbound ports stored in tables 132 and constrained by the records in 134. For all addresses, the Internet task also accesses the source address table which contains information defining which outbound ports should not be used for a multicast transmission to this group (destination address) from a particular source and other source filtered information.

Efficient multicast transmission requires some evaluation of the shortest route to all members of the group from the source location. The present system utilizes the directory 130 and routing table structure 132 and 134 for the already existing Link-state approach. Other existing methods have similar needs and could be incorporated into the design if another routing method is employed by a network.

The novel Internet routing task set forth herein is self learning. No information about any existing addresses or their routes need be stored in the task prior to start up. The routing information is entered into the routing table 130 as a result of the Internet routing protocol activity or network management protocols. When a router starts up, it sends out "I am here" messages using the Internet routing protocol. All of the adjacent routers or nodes send back IP routing protocol packets which, when combined with the input bound channel, contain the information necessary to fill in the routing tables for all active Internet addresses.

The novel system uses arithmetic coding of the directory index 130 as shown by the diagrammatic illustration in FIG. 4. Arithmetic coding is a powerful technique for obtaining the near minimum entropy compression of a sequence of data bits. Since a network address is just a sequence of binary data bits of known length, the minimum entropy compression of all the combinations of bit strings represented by all of the active network addresses should produce the shortest number of bits which would uniquely identify all of the addresses. This encoding could then be used as an index 136 into the routing directory 130. Essentially arithmetic coding uses the distribution statistics of the symbols (in this case octet values) to divide a unit space into a unique fraction based on the sequence of symbols (octets) presented. As each symbol (octet) is presented, the unit space is subdivided into a smaller range. Symbols (Octets) with higher probability of occurrence reduce the range less than those with small probability, causing fewer bits to be used in encoding the higher probability octets. A detailed discussion of such method including program fragments and examples is disclosed in a paper published by Witten, Neal, and Cleary, *Arithmetic Coding for Data Compression Communications of the ACM,* June, 1987. This paper is oriented to adaptive encoding and decoding of data streams and does not deal with the specific application of address detection. However, the method disclosed in that paper can be used for that purpose. Thus in FIG. 4, the destination address 126 is compressed by the arithmetic code process 138 to obtain an integer 140 which represents the address. If further compression is needed, the integer can be compressed through truncation 142 by methods well-known in the art and further compressed if needed by hashing 144, a technique also well-known in the art. The resulting index 136 is then used to find the unique address in the compressed address directory 130. The routing switch designs 38 and 96 shown in FIGS. 2 and 3 are specific implementations of the novel arithmetic compression process employed by this invention.

After all the address octets have been processed, the last value is then the compressed value of the input address octet string. It is sufficiently compressed to be useful as a routing table index.

The novel index table construction and address compression processing of this invention takes place as follows: Addresses can be fixed and variable length bit strings embedded in the Media Access Control (MAC) 120 and Internet protocol (IP.ISO) 124 headers of the received communication packet. The maximum size (Address_length) of an address which can be compressed is set by a management decision and the physical design of a particular implementation of the process.

Symbols are consecutive sets of adjacent bits taken in sequence from the address bit string. Successive symbols may have a fixed overlap incorporating a fraction (Overlap_fraction) of the same bits from the address bit string in an adjacent symbol. All the valid bits in the address string must be included in symbols processed. For a particular implementation of the process the symbols are a fixed number of bits in length (Symbol_size) which can vary from 2 bits to any number of bits. In the embodiments presented in FIGS. 2 and 3, a symbol is an "eight" bit octet. The number of symbol positions in an address string (Num_symbol_positions) is the length of the address string in bits divided by the symbol size minus the product of the symbol size and the overlap fraction. Thus, Divisor=Symbol_size-(Symbol_size×Overlap_fraction) Num_symbol_positions=Address_length/Divisor An address index table (66, 68 and 98 in FIGS. 2 and 3) has a number of banks equal to the number of symbol positions in the address string. Each bank of memory in the address index table has a number of memory locations (Bank_size) equal to "two" to the power of the symbol size. Sub-index values are stored in the non-zero locations of each bank. Thus, Bank_size=2 raised to the Symbol_size power.

The address index table size (AI_table_size) is the product of the bank size (Bank_size) and the maximum number of symbol positions (Num_symbol_positions) being processed.

The maximum number of non-zero entries, called the allowed maximum count (Allowed_max_count), in each bank of an address index table is set by a management decision. Addresses may be encoded into the address index table until the number of non-zero entries reaches the allowed maximum count for any symbol position. If the encoding of any address value into the address index table results in the number of non-zero entries in one of the symbol positions exceeding the maximum allowed number of entries, then the address cannot be encoded into the table until another entry in this symbol position is removed, that location made zero, and the current count decremented by one. Alternately, the allowed maximum count may be increased by a management decision and all the existing address bit strings must be recoded into the address index table using the new maximum non-zero entry values.

The address index tables (66, 68 or 98) are then incrementally filled in with sub-index values as particular address bit strings are encoded into the address tables. This processing takes the following steps.

Initially the table (66, 68, and 98 in FIGS. 2 and 3) is entirely filled with zero entries and the value of all locations in the table is set to zero.

(1) A counter (Current_count) is established by the learned address logic 88 for each symbol position to keep track of the number of non-zero entries in this bank of the address index table and these counters are initially set to zero. In order to keep track of the number of addresses using a particular non-zero location in the address index table, a use counter is established in the learned address logic 88 for each non-zero location in each bank of the address index table.

(2) The allowed maximum non-zero entries value for each symbol position is obtained from a management decision.

(3) A range value (Range) is computed for each symbol position. The first range value is computed by setting the range for some symbol position to the allowed maximum count for that symbol position. The range value for the next symbol position is the range value for the previous symbol position times the allowed maximum count for this symbol position. The range value for each symbol position is the product of the range value of the next previously computed symbol position and the allowed maximum count for this symbol position. The order of the symbol positions used to compute the range values is only important in that the decoding operation used to recover the original address before encoding to an integer value must use the same symbol order as that used to compute the range values. The sequence of range value computations from the last address symbol to the first address symbol must be used to preserve heiarchical structure of the structure of the original address being encoded.

Range (I)=Range (I+1) times Allowed_max_count (I)

Each symbol from an address bit string to be encoded into the address index table is processed in the same sequence as that used to process the address symbols during receipt of the packets from a transmitter for routing table access.

(1) Use the numeric value of the symbol as the address of the location in this symbol's bank of the address index table (66, 68 and 98).

(a) If the existing entry in this location of this bank of the address index table is not zero, then increment the use count for this location and no further processing of this symbol is required and the next symbol may begin processing.

(b) If the existing entry at this location in this bank of address index table is zero, then non-zero entry value is computed by (1) incrementing the current count for this symbol position, (2) checking to be sure the incremented current count is less than or equal to the allowed maximum count for this symbol position, and (3) (if the count is not greater than the maximum) computing the value of the incremented current count multiplied by the range value for this octet position and divided by the allowed maximum count for this position and storing this value in this location in the address index table and setting the use count for this location to "one". If the incremented current count is greater than the allowed maximum count for this symbol position, then this address cannot be encoded into the address index table and the management entity is notified that the address index table has overflowed unless another address is removed from the table making a use count go to "zero" and reducing the current count for this symbol position.

(2) Continue processing address bit string symbols until the entire address has been encoded into the address index table by having for each symbol in the address a non-zero value for that symbol value location in every symbol position bank of the address index table.

Address bit strings embedded in the incoming packets are compressed in the combine table outputs 70 and 72 in FIG. 2 and in arithmetic computation 102 of FIG. 3 to an integer value by adding together the stored values from the address index table bank for each symbol position where the symbol value is used as a location address into the bank for that symbol in the address index table. If any index table value accessed is zero, the processing stops and the zero detect 90 is activated. This zero indicates the address has not been encoded into the address index table.

If the number of significant bits in the encoded integer are larger than the size of the compressed address directory 130, then truncation 142 (removing some low order bits) and Modulo N hashing 144 (removing some of the high order bits) may be used to reduce the size of the encoded address integer to the number of locations in the compressed address directory 130.

To decode the original address from the encoded integer and to remove the encoded address from the address index table, the decoding process starts with the symbol position for which the Range value was set to the allowed maximum count and proceeds in the same symbol sequence as the Range values were computed.

(a) Starting with the first range symbol position (the position that was set to the allowed maximum count), the encoded integer—before truncation or hashing—is searched in the low order bits for a value between 1 and the allowed maximum count for the symbol position. The result of this operation is the value obtained from the address index table for this symbol position and that table sub-index value was added to the integer value to create the final integer number.

(b) The location for this remainder value in this symbol position bank of the address index table is found, the use count for this location is decremented by "one", and the position of this location in the bank is the original symbol value for this symbol position. If the decremented use count is zero, then the current count is also decremented by one. If the current count reaches zero, then no addresses are encoded into this position in the address index table.

(c) To decode the second symbol in the sequence of symbol positions used to compute the range values, the value from the previous operation is subtracted from the integer value. The resulting integer value is then searched for the low order bits for a sub-index value between the previous range value and this range value. This sub-index value is the value obtained from the address index table for this symbol position which was added to the integer value to create the final integer number. The location for this sub-index value in this bank of the address index table is found, the use count for this location is decremented by "one", and the position of this location in the bank is the original symbol value for this symbol position. If the decremented use count is zero, then the current count is also decremented by one. If the current count reaches zero, then no addresses are encoded into this position in the address index table.

(d) To decode each successive symbol in the sequence of symbol positions used to compute the range values, the sub-index value from the previous operation is subtracted from the integer value used in the previous operation. The resulting integer value is then searched in the low order bits for a sub-index value between the previous range and the current range for this symbol position. The resulting sub-index obtained with this operation is the value obtained from the address index table for this symbol position which was added to the integer value to create the final integer number. The location for this sub-index value in this bank of the address index table is found, the use count for this location is decremented by "one", and the position of this location in the bank is the original symbol value for this symbol position. If the decremented use count is zero, then the current count is also decremented by one. If the current count reaches zero, then no addresses are encoded into this position in the address index table. This process is repeated until the integer value is reduced to zero.

The sequence of symbol values produced are the symbol values used to encode the integer from the original address bit string. From these symbol values the original address bit string can be reconstructed by placing the symbol values in their symbol positions in the original bit string.

Thus there has been disclosed a data communication system which uses a routing table access method that treats network addresses as variable length symbol strings without internal structure—i.e., as flat addresses—to simplify the handling of mobile end-systems simultaneously connected to multiple access points. The system utilizes high speed, Media Access Control and Internet processes which handle multicast messages to multiple, mobile hosts. The technique is also applicable to real time database applications such as a network name service which relates a logical name (alphanumeric name) to its universal identification code. For example, an automatic telephone directory service could use this system to enable entry of a particular name and receive the telephone number of that name. Thus, the novel system allows one entity having a universal identification number to communicate with any other entity in the system having a universal identification number but whose physical location is unknown. Because the Internet router system is based on a flat logical address space, it provides efficient routing of both multicast and unicast packets independent of the internal network address format or structure.

Further, reversible arithmetic code compression techniques are used to reduce the size of the network address index and dynamic hashing is used to reduce the size of the routing table directory. Importantly, a message address is used that is structure-independent of the location or network attachment of the message receiver.

Referring now to FIGS. 5–9, two additional methods of constructing index tables are disclosed.

The routing table access method and apparatus described in connection with FIGS. 2–4 has, as already discussed, real time data base applications other than the date communications network of FIG. 1. Those of ordinary skill in the art will readily recognize that the routing table access method and apparatus of FIGS. 2–4 describe an associative memory employed in context of a communications switching application. The possible applications of this same associative memory scheme are numerous and diverse; it is not confined to communications switching systems. For example, it has application in such diverse systems as those for on-line telephone directories, radar target tracking, and sonar signal classification—almost any system or application requiring or using high speed access to real-time databases where information is accessed with key values without knowledge of precisely where it is stored within a memory system. It is especially useful for systems utilizing very large key-spaces, when the number of keys that are actually used to access data records stored in memory constitute a fraction of the total number of possible keys. For these reasons, the two additional methods of constructing the index table will be described with reference to a generic application in a host system.

Figure 5:
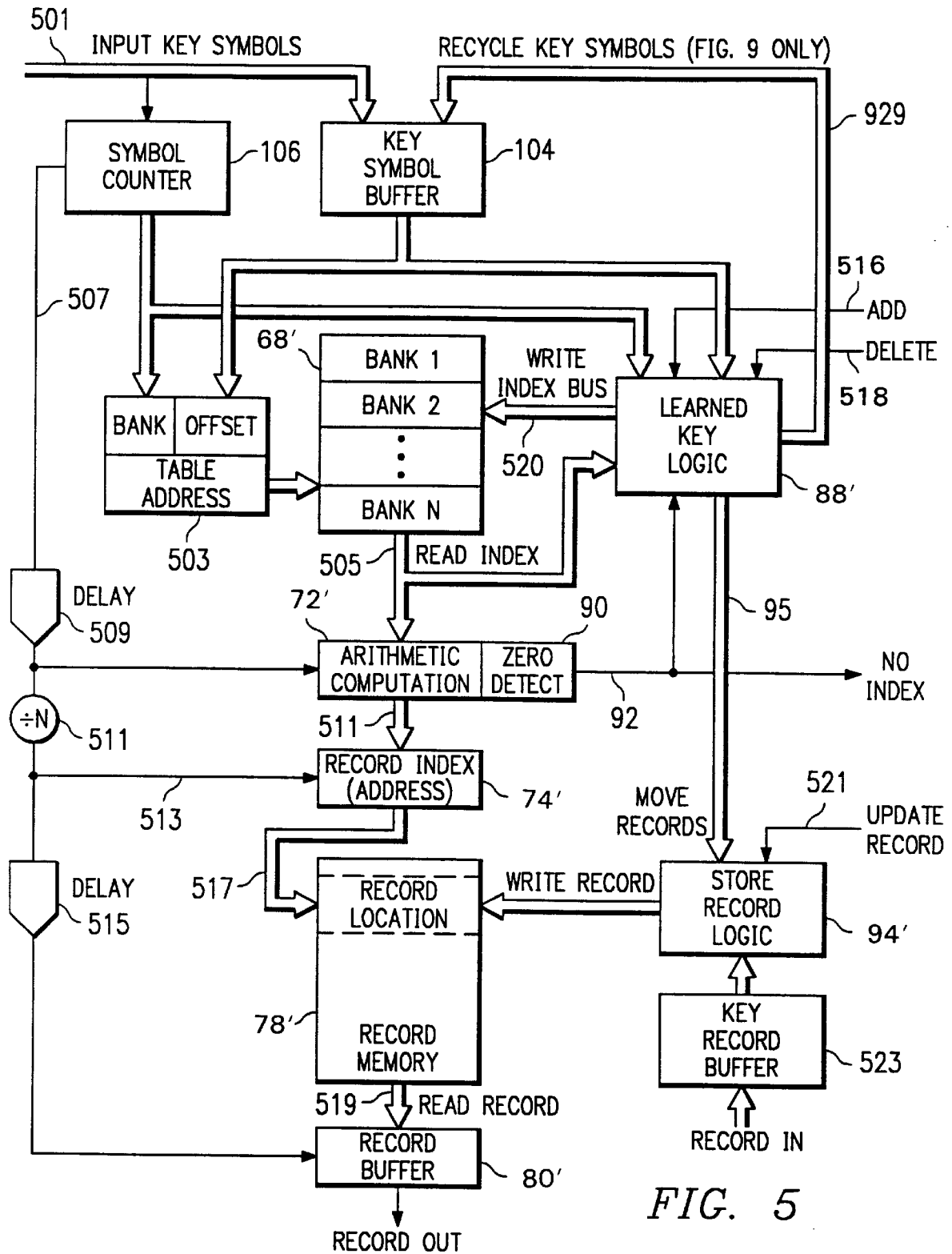
FIG. 5 is a schematic representation of components of an associative memory module.

Referring now to FIG. 5, this figure essentially illustrates the associative memory of FIG. 3, shown with the addition of learned key logic 88' and stored record logic 94 of FIG. 2. The only difference between FIGS. 2 and 3 are the manner is which symbols comprising the addresses are processed: in parallel in FIG. 2; and in serial in FIG. 3. The purpose of FIG. 5 is to introduce generic terminology for the associative memory of FIGS. 2–4. For example, the addresses, both destination and source, of FIGS. 2–4 are simply types of "keys". A key is a unique string of bits that will be used to look up or access a "record" or a "key record". The routing information or "address record" of FIGS. 2–4 is simply a type of "record". A record is another, typically much longer and not necessarily unique, string of bits that the system in which the associative memory is located is trying to store, access, update or delete. In most applications, at least part of the key is found in the record. The key has a maximum predetermined length or number of bits, as previously explained, which are divided into "symbols" of predetermined length and positions. These symbols may or may not represent alphanumeric characters, as those of the ASCII code, or any other type of characters. The key, for example, may be part of a digitized waveform stored as a record. The symbols may also be overlapping—that is, share bits. There is no limitation on what the record and the key represent. They need only be a string of data values.

An associative memory module 500, a preferred embodiment of invention, is used with a host system. One such host system, embodying an associative memory module, is the communications switching apparatus of FIGS. 1–4. The associative memory module receives from the host system a key on input line 501 in a sequence of key symbols, Symbol[i], where i=1 to N and where N is the number of symbols in a key. Associative memory 500 processes one key symbol at a time. Associative memory module 500 may also be reconfigured to process all the symbols of the key at the same time, in parallel, as shown in FIG. 2.

A key symbol, when received, is stored in key symbol buffer 104. Symbol counter 106 counts the symbols as they are received so that the position where the current symbol is stored in the key symbol buffer 104 is always known. The value of the symbol counter is the current symbol position "i". As represented by block 503, an address for index table 68' is generated from the position "i" and the value of the key symbol stored in the buffer 104. The position of the symbol within the key taken from the symbol counter 106 selects a bank, Bank[i], in key index table memory 68', and the value of the key symbol taken from buffer 104, Symbol [i], is the offset address within the bank.

Key index table memory 68' basically stores a table of values, called key index values. The memory storing this key index table must then be divided, either physically or logically, into banks 1 to N, as shown. Each bank is, in turn, divided, either physically or logically, into offset addresses that a predetermined number of bits that store a key index value. The size or number of bits addressed by the offset must be large enough to accommodate the size of index values stored therein, and the number of offset addresses depends on the size of the key symbols. The number and size of offset addresses depends entirely on the application.

The index table memory 68' is any type of memory capable of, at minimum, storing a table of values: for example, a random access memory (RAM) or a read only memories (ROM). There is no inherent limitation of the storage media, whether it is electronic, magnetic, optical or some other type. Nor is there any limitation on the hardware configuration of the memory. The only limitation is that it can be addressed as just described, while, preferably, meeting desired performance criteria. Generally, a very fast memory is preferable so that keys are processed as rapidly as is necessary for the application. For example, where k number of bits are required for storing an index value, a single k-wide memory chip is likely to be the simplest and quickest way of implementing the index table memory, presuming the chip is large enough. Minimal address decode circuitry is required. On the other extreme, use of extensive address decoding circuitry may slow performance. Cost, size, and durability constraints, restrictions posed by operating environment and many other design criteria associated with a particular application will determine what type of memory is best suited for implementing the index table. For example, where, as in several of the embodiments of the invention, data is written to the index table memory during processing of a key, the memory must be randomly accessed. Where index table memory is not updated, Read-Only random access memory may be used.

The data value or index that is addressed is read onto line 505 to arithmetic computation logic circuitry 72'. Arithmetic computation logic is primarily comprised of a Modulo (P) adder, where P is approximately the number of logically addressable memory locations in key record memory 78'. In the preferred embodiment, P is chosen to be a prime number. Arithmetic computation logic circuitry 72' is initialized or set to zero before receipt of the first symbol in a key is presented on line 501. As the index value is read onto bus 505 from the index table memory, symbol counter 106 provides an enabling or clock signal on line 507. The enabling or clock signal from the symbol counter is delayed by delay device 509 by a time greater than the access time required for the index table memory 68' but less than the period between symbols presented on input bus 501. When enabled, the arithmetic computation logic circuitry adds an index value on line 505 to a previously computed sum, in effect keeping running total. When the running total exceeds P, P is subtracted from the running total. The arithmetic computation logic circuitry thus performs a Modulo (P) addition of the index values stored in the index table memory for each symbol in the key to create a final sum called a record index. The record index is a data value that will be used as a logical address to the place within key record memory 78' in which the record corresponding to the key presented on input lines 501 is stored.

Arithmetic computation logic circuitry also includes zero detect circuitry 90 for indicating that an index value received on line 505 from the index table memory 68' is zero. By definition, a zero value stored in an entry of the index table for a symbol, as defined by its position within the key and its value, indicates that the symbol value has not been encoded into the index table and therefore no key record is stored in the key record memory 78' associated with the key that has been presented. The zero detect or "No Index" signal is provided on line 92 to the host system. The choice of zero as the value which indicates an index has not been assigned to that location in 68' is not critical to correct operation. Any bit pattern may be selected to indicate "no index" has been assigned. The index tables 68' are then initialized with that bit pattern and "zero detect" is changed to detect that pattern. Using bit patterns of all "zero" or all "ones" are convenient choices.

Once the last symbol of the key is processed, the final sum or record index in the arithmetic computation logic circuit 72' is read to the record index buffer 74', also called a key record memory address buffer. This value is the key record memory address that is presented on address lines 517 to key record memory 78' in order to access the record associated with that key. An enabling or clocking signal on line 513 causes the record index buffer 74' to store the record index and provide it on address lines 78' to the key record memory 517. To generate the enabling or clocking signal on line 513, the enabling signal provided to arithmetic computation logic circuit is divided by N, the number of symbols in the key, by divider circuitry 515.

Record memory 78' stores records of data that are accessed by presenting a key to the associative memory module 500 and decoding it into a record memory address as described above. Upon presentation to the record memory, the record memory address enables access of a record associated with the key and, with an appropriate read command (not shown) reads it onto output lines 519 to be stored by key record buffer 80' when enabled by a signal from delay element 515 (the delay element providing sufficient time for accessing the memory and reading out the record of data onto lines 519).

In essence, therefore, a record of data desired by a host system using the associative memory module 500 is accessed by presenting a key associated with that data and generating an address where the record is stored in a memory from a specially encoded index table 68'. The key is uniquely associated with that record of data, though the record of data is not necessarily uniquely associated with that key.

How the record memory address is physically and logically constructed, as well as the form of the record memory address presented to the memory for access, are innumerable. The record memory address need only access the record of data associated with the key; how it does so depends on the memory chosen and the application. For example, the record memory address can be the actual physical address of the record where the memory bandwidth is equal to the largest size of any of the records stored. Where memory bandwidth is too small, the key memory address may be comprised of block-frame address, with a block-offset address being generated by separate circuitry (for example, a counter that would be included with the record memory 78') that strobes block-offset address lines to read out the record of data. On the other hand, the record memory 78' may be constructed as a virtual memory of some type, where the record memory address is mapped to the actual location. The mapping circuitry is included within record memory 78'. A virtual memory implementation is generally not preferred, as this simply adds a second layer of mapping that slows access times. However, as the associative memory module 500 is designed to handle large numbers of keys, it may be desirable possibly to use it with some types of virtual memory.

It should be further noted that the amount of memory space allocated for a record of data is usually fixed (though, if desired, it can be variable). If the record is too large, a pointer is stored in the record space pointing to the location of part or all of the actual record of data.

No limitation is placed, as with the index table memory 68', on the actual hardware configuration or hardware of the key record memory 78'. Again, any media may be employed, preferably of a random access variety so that key records may be updated, added and deleted. However, some applications will need only ROM, which is generally faster. For reasons of speed, the type of memory should be chosen to have access times suitable to meet the particular application, subject to the limitations of space, cost, power consumption, heat dissipation, and durability.

Where adding, deleting and updating records of data are desired, as with the communications system of FIGS. 1–4, several additional logic circuits are incorporated in the associative memory module 500. These logic circuits may be dedicated circuits or programmable devices which implement the logical functions of the circuits. The host system for the associative memory module may also augment or be used in place of some or all of these devices to handle some or all of the processing that is carried out by this circuitry.

To update a record already stored by record memory 78', an "UPDATE" command on line 521 is presented to store record logic at the same time the record's associated key is placed on input key bus 501. Store record logic 94' then writes the updated record stored by the host system in key record buffer 523 into record memory 78' at the record memory address generated from the key.

Adding records and their keys requires that its key be "learned". The key for the record to be added is presented to the associative memory module on input lines 501; the record to be added is placed in key record buffer 523; and an "ADD RECORD" command is given on line 516. Each symbol of the key is processed as previously described. Frequently, at least one, and sometimes all but one, of the symbols in the key has already been encoded. If a symbol (as defined by its value and position within the key) has been encoded, learned key logic performs no function, and the key index values are read into arithmetic computation logic circuitry 72'. However, when zero detect circuitry 90 reads a zero on line 505 from the key index memory 68, a zero detect signal is provided on line 92 to learned key logic 88', as well as to the host system as a "No Index" signal. This "no index" or zero detect signal means that the table entry—the symbol position and value—contains a zero. At this point, learned key logic circuitry 88' generates a new key index value and provides it to key index table 68' on write index bus 520. The index table memory then stores it in the entry of the key index table memory indicated by table address 503. As will be discussed in connection with the remaining Figures, learned key logic circuitry 88' requires, in order to generate the new index value for the key symbol, the key symbol value and position, and index values on read index line 505. Therefore, learned key logic is coupled to the key symbol buffer 104, the symbol position counter 106, and read index bus 505.

Processing the key symbols presented on lines 501 then continues as before, with learned key logic generating new key indexes as necessary. When all of the symbols of the key have been processed, and their corresponding key index values added to a record index value 74' by the arithmetic computation circuitry 72', the record in buffer 523 is stored in the key record memory 78 at the location indicated by the record index.

To delete records, the host system presents a "DELETE RECORD" command on line 518. To perform the delete function, the key must be presented on input key bus 501. Learned key logic 88' then deletes any key index value that is being used only by the key associated with that record by writing a zero into the table entry with write index bus 520. Deleting any unused index values permits them to be reused for the un-encoded key symbols that may be subsequently presented, thereby providing more efficient use of the record memory 78'. The "deleted" record is simply overwritten with a new record when one is presented.

Please note that where an ability to add, delete and update records is not desired, learned key logic circuitry is not necessary. All that is required is an encoded index table memory 68', arithmetic computation circuitry 72', key record memory 78' written with all of the records and suitable timing circuits and buffers. The index values that are stored in the index table memory 68' may be generated separately on a general purpose digital computer, from a known set of keys, and then stored in the memory. One of these methods for doing so has already been described in connection with FIGS. 2–4. Two others will be described in connection with the remaining figures. If the index table memory is a ROM, for example, the index values are stored in the manner provided by the ROM device.

Figure 6:
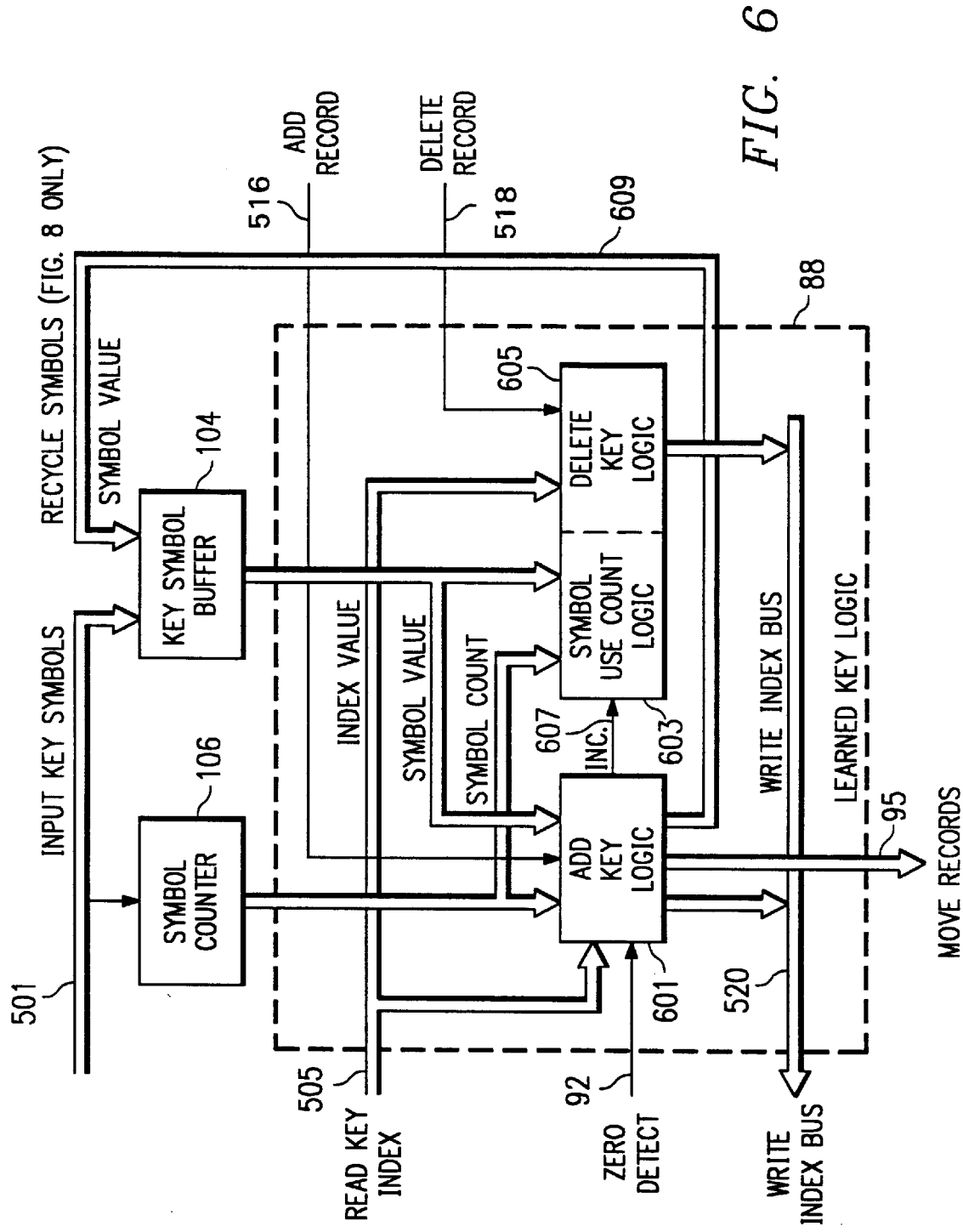
FIG. 6 is schematic representation of a circuit for learned key logic for the associative memory of FIG. 5.

Referring now to FIG. 6, learned key logic circuitry 88 includes three main components: add key logic circuitry 601; symbol use count logic circuitry 603 and delete key logic circuitry 605.

The function of add key logic circuitry is to generate new keys that are provided to write index bus 520 for storing in the key index table memory 68' (FIG. 5). In one embodiment, add key logic recycles key symbols to key symbol buffer 104 with bus 609. Add key logic is coupled to symbol counter 106, key symbol buffer 104, read key index bus 505, zero detect line 92 and "ADD RECORD" command line 517 so that it receives the current key symbol position or count, key symbol value and key index in addition to the zero detect and add command. Add key logic provides an increment (INC) command on line 607 to symbol use count logic 603 for each key symbol presented on line 501 during an add key operation.

Symbol use count logic 603 tracks for each key symbol value and position, or entry in the key index table memory 68, the number of different keys that share that particular symbol value and position. Symbol use count logic receives the symbol value and symbol position from key symbol buffer 104 and symbol counter 106, and the increment command signal from add key logic on line 607. A key index value for a particular symbol that is shared by more than one key cannot be deleted. If symbol use count logic circuitry indicates that a particular symbol has been encoded into the index table for only one key, then delete key logic circuitry 605 writes a zero to the write index bus 520.

Figure 7:
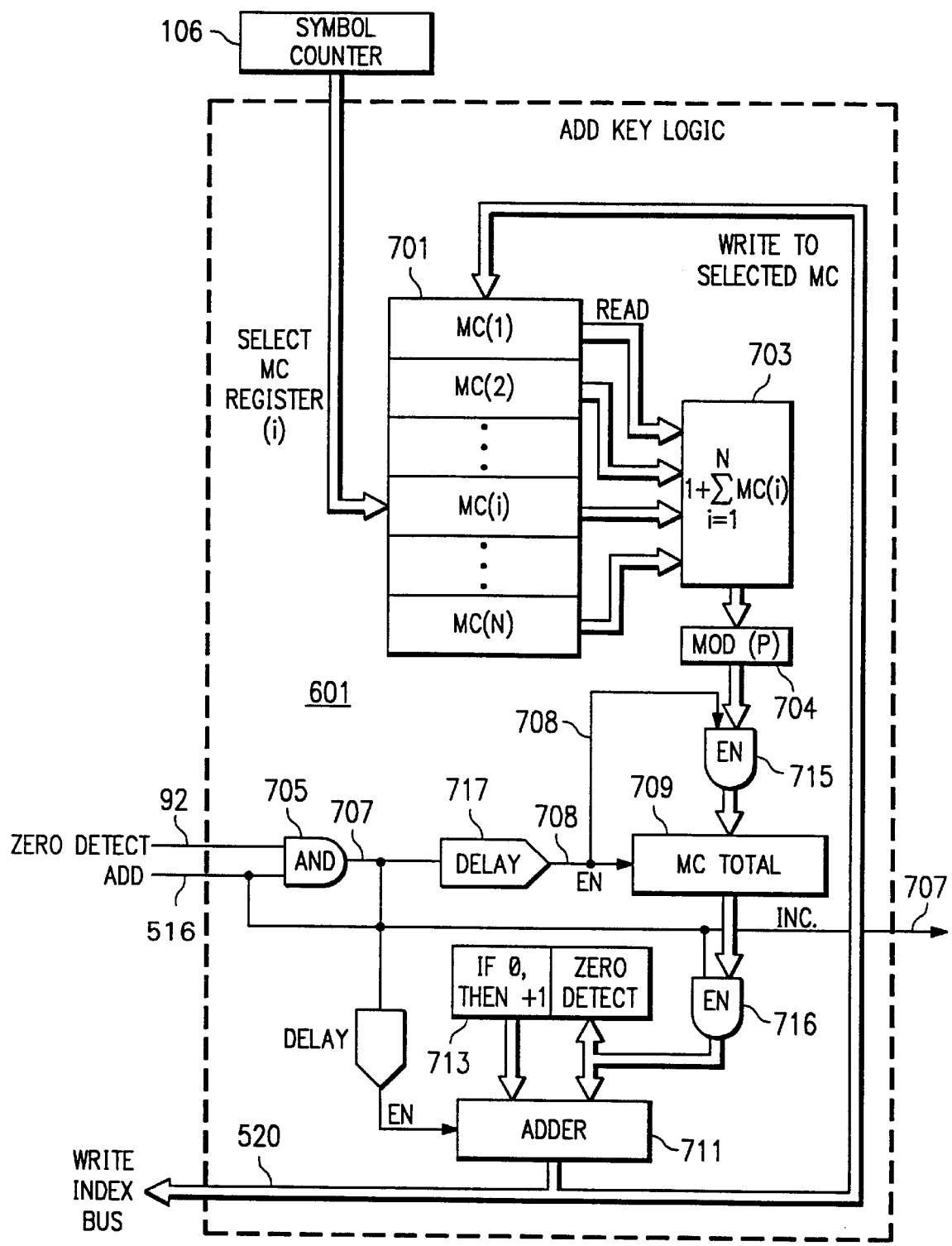
FIG. 7 is a schematic circuit representation of an add key logic component of the learned key logic of FIG. 6 that implements a first method for adding keys to the associative memory of FIG. 5

Referring now to FIG. 7, illustrated is an embodiment for add key logic circuitry that implements a process for encoding keys presented to the associative memory in a random order into the key index table memory using a data compression technique. This process is a variation on the method earlier presented in connection with FIGS. 2–4, but has the advantage that a maximum number of non-zero values in any key symbol position does not have to be selected in advance.

The value in symbol counter 106, the symbol position, selects one of N max count (MC) registers 701 into which the latest index value from 711 is stored when a new Index Table value is created for that symbol position. N is the number of symbols in a key. Each MC register stores a value termed the maximum count (MC). The value MC(k), where k is a number for a key symbol position between 1 and N, is the largest key index value taken Modulo (P) currently being stored in symbol bank k of the key index table memory 68' (FIG. 5).

Adder 703 sums together all MC values, MC(1) to MC(N) and adds one to the sum. The sum is a value MC Total which is then passed through Modulo (P) operation circuit 704, which subtracts P from MC Total if P<MC Total<2P, which is stored by buffer 709 upon receipt of an enabling signal on line 708.

During an add record operation, when the ADD command signal is true—in this case arbitrarily chosen to be a logic high voltage signal—receipt of a true zero detect or no index signal produces from AND gate 705 an enabling command (EN) signal on line 707. The EN signal immediately enables buffer 709 (through AND gate 716) to read out a value MC Total into adder 711, and also enables adder 711 to read MC Total and sum it with a pad value 713. The sum of the pad value and MC Total, which is a new key index value, is placed on write key index bus 520 for writing to the key index table 68'. This new key index value is also written to the MC register that is currently selected by symbol counter 106 and then summed with all the values in the MC registers by adder 703 to generate a new MC Total to be used by a next add key operation. The pad value (713) is to add one to the computed index value if the MC Total is zero.

Figure 8:
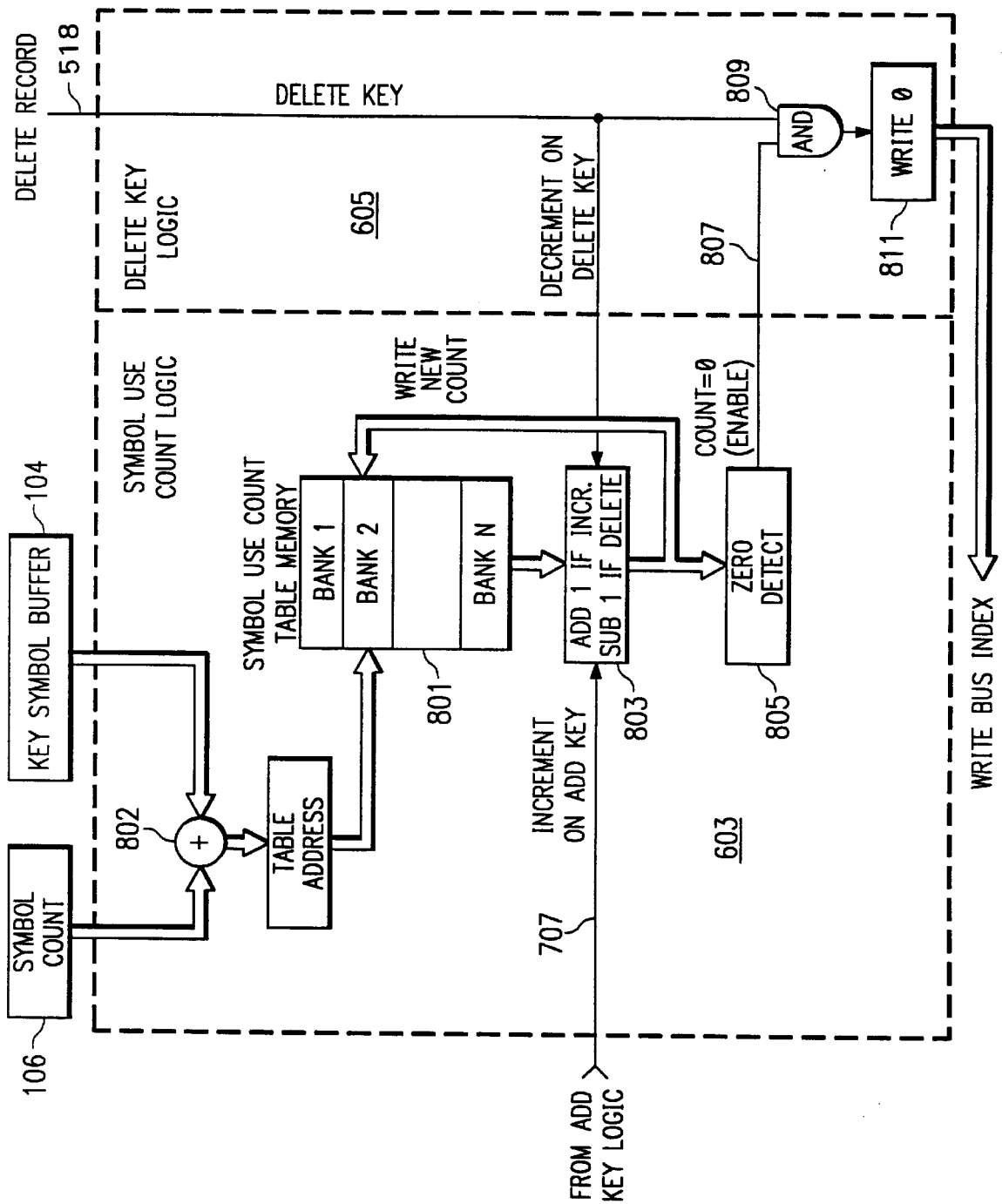
FIG. 8 is a schematic representation of a circuit implementing symbol use count logic and delete key logic for the learned key logic circuit of FIG. 6.

The enable signal on line 707 is also provided to as an "increment" (INC) command signal to symbol use count logic circuit shown in FIG. 8.

To prevent the new MC total from being read onto the index table bus 520 during the same add key operation, the enabling signal on line 707 is delayed with element 717 to produce the delayed enabling signal on line 708 that enables, with the use of ADD gate 715, writing the sum from adder 703 to the MC Total buffer 709.

Referring now to FIG. 8, symbol use count logic circuit 603 tracks the number of times a particular symbol, Symbol [i] in a particular symbol position or bank i, is used by different keys. The key index value assigned to Symbol[i], INDEX[i,Symbol[i], can be deleted when it is no longer being used by any key. Essentially, it uses a symbol use count table memory 801 that is constructed and addressed like the key index table memory 68' (FIG. 5). As indicated by summer 802, values in symbol counter 106 and key symbol buffer 104 are used as bank and offset addresses, respectively, to a particular table entry for the key currently being processed. The data value stored in each entry is the number of keys that are currently encoded that share or use the value Symbol[i] in position i.

When the table memory 803 is addressed, the use count for Symbol[i] is read into counter 803. When a key is being added, the value in counter 803 is then incremented by one with an INC command signal on line 707 from add key logic circuit 601 (FIG. 7). In essence, this counts the number of times a particular symbol[i] has been presented to the associative memory as part of a key that is being added. When a record is being deleted, counter 803 is decremented by one with the delete record command on line 519.

After expiration of a period of time allowed for the step of incrementing or decrementing, the value in the counter 803 is written back into the table memory 801 at the same table address. It is, further, read by zero detect circuit 805. If a zero count is detected during a delete record operation, a logic signal on line 807 goes high. This signal and the delete record command on line 509, also a logic high signal, are provided to AND gate 809, which is part of delete key logic circuit 605. Both signals going high causes a zero to be written on to write index bus 520 by circuit 811.

Referring now to FIGS. 7 AND 8, the described embodiment utilizes dedicated circuitry. However, alternate embodiments include specially programmed logic devices and general purpose computers, or a combination of these devices. The process carried out by these embodiments of learned key logic circuitry 88 is as follows.

Initially, the index table memory 68 is written with all zeros or null ("no index") values as expressed by the equation INDEX[i,Symbol[i]]=0, where INDEX is the key index value stored in the index table for symbol value "Symbol[i]" in symbol position i. Index values are encoded, according to the following process, into the index table memory until two different keys have index values (not necessarily the same) which to Modulo(P) sum to the same value. P is the memory size, and the Modulo (P) sum value being the record index value 74' (FIG. 5). If a new key is presented whose key index values add to the same record index value as a previously encoded key, this new key cannot be added until the previous key has been deleted, or the two keys are the same.

The first symbol that is encoded to an empty key index table memory is assigned a key index value of 1. Subsequent new symbols are assigned increasing values. The initial value of each of the max count registers 701 are written with a zero, such that MC(i)=0 from i=1 to N. The initial value of MC Total in buffer 709 is set equal to 0.

As additional keys and records are presented for addition to the associative memory, each key symbol, Symbol[i], in a sequence of symbols, i=1 to N, making up the key is processed as follows.

If the zero detect circuit 90 (FIG. 5) detects a nonzero value on the read key index table bus 505 (FIG. 5), as indicated by a logic signal on line 92, a key index value, INDEX[i,Symbol[i]] has already been assigned for this symbol and entered into the key index table memory. Therefore, a new key index value is not computed and stored for this key symbol. The symbol use count for the symbol, COUNT[i,Symbol[i]], that is stored symbol use count table memory 801, is incremented by one as previously described. The next key symbol is then processed.

If zero detect circuit 90 detects a zero value on the read key index table bus 505, no key index value has been entered or encoded for the particular symbol value occurring in the particular position. Add key logic 601 then determines a new key index value, INDEX[i,Symbol[i]], and stores it in the key index table memory 68' (FIG. 5) corresponding to the particular value and position of the symbol. The symbol use count for the symbol, stored in the symbol use count table memory 801, is set to one. The operation of the circuitry explained; expressing mathematically these steps to compute a new index value:

(1) Set INDEX[i,Symbol[i]]=MC_Total+Pad_Value;

(2) Set MC[i]=MC_total if MC Total>0 or =1 if MC_Total=0;

(3) Set MC_Total=Sum of MC[k], k=1 to N plus 1 MOD(P); and (4) Set Count[i,Symbol[i]]=1.

Once all the symbols in the key have been processed, a record index value for the key is determined by summing module(P) all of the key index values, INDEX[i,Symbol[i]], i=1 to N. The host system then checks the record stored in the record memory 78' (FIG. 5) addressed by the record index and read into record buffer 80' (FIG. 5). If the record is not "null", then a record and its key have already been assigned to this memory location in the record index memory. The new record and key cannot be added unless the previous record and key are detected.

Referring now to FIGS. 9 to 16, these figures disclose a third method (in addition to the two methods previously described in connection with FIGS. 2–4 and 7, respectively) of adding keys (the actual records may be stored later) using a different add key logic circuit. Basically, this method or process assigns key index values for key symbols when keys are presented in a monotonically sorted or lexigraphical order (either ascending or descending) for entry into the associative memory. The sorted order of the keys helps to eliminate "holes" for possible combinations of key symbols which are not presented in a sorted order or sequences, creating a near "perfect hashing" or "perfect packing". Should a key be presented whose sum of key index values is the same as the sum of key index values for a previously entered key, current or previous key index value assignments are changes, and any previously stored key records are moved in memory to create a "hole" for the new key. The adding process is completed when the highest or last record memory location is filled.

Figure 9:
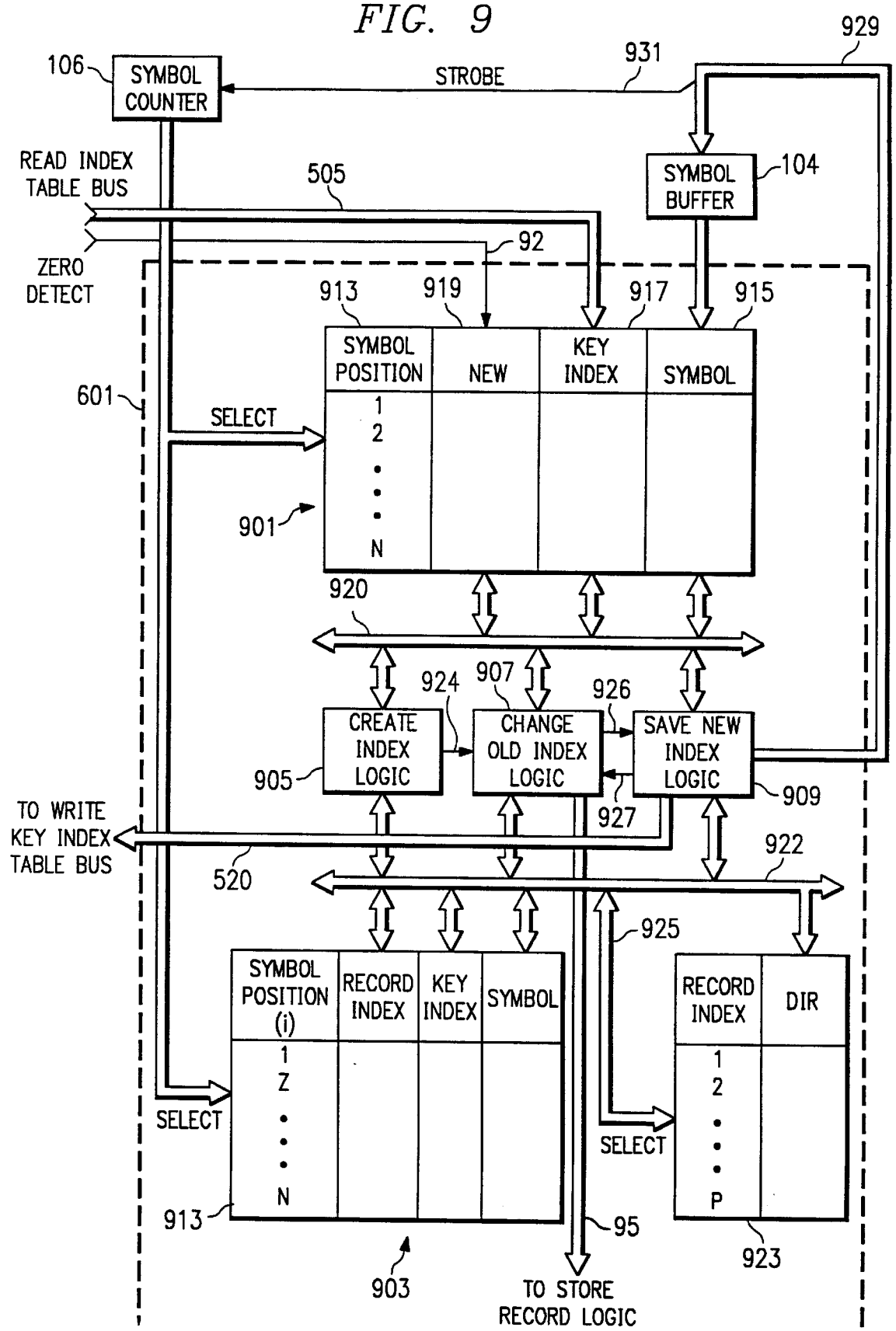
FIG. 9 is a schematic representation of a circuit embodying a second method of implementing a method for adding keys to the associative memory of FIG. 5, comprising add key logic component of the learned key logic of FIG. 6.

Referring now to FIG. 9 only, showing in schematic representation a dedicated circuit embodiment utilizing this method, add key logic circuitry 601 includes as major components: save table 901; change table 903; create index values logic circuit 905; change old value logic circuit 907; save new index logic circuit 909; and a directory table 923. The save table 901, change table 903 and directory table 923 are data structures stored in a random access memory. The logic circuits 905, 907 and 909 are shown to be dedicated circuits (possibly LSI or VLSI devices), but may implemented with programmed logic devices, general purpose computers, a microprocessor, or a combination of these performing the steps of the method.

Both the save table and the change table have one row of values for each symbol position i in a key, i=1 to N, as shown by symbol position columns 913 in each table. Symbol counter 106 is therefore used to select a row in the save table, identified as Save[i], and in the change table, identified as Change[i]. Each table has three additional columns for storing values associated with Save[i] and Change[i]. The save table keeps values of the symbols for the current key being added.

In the save table 901, column 915 stores a value Save[i].symbol. This value is set equal to the symbol value, Symbol[i], from symbol buffer 104. Thus, Save[i].symbol=Symbol[i]. Column 917 receives from the key index table on read key index bus 505 an index value for Symbol[i], Index[i,Symbol[i]], and stores it. The column 919 receives the zero detect logic signal on line 92 and stores a value for a variable Save[i].new. This value is "new" (actually a data value arbitrarily chosen to represent "new") when a zero detect signal is received, indicating that the value for Save [i].index is new and that Symbol[i] had not been previously encoded into the key index table memory. Thus, Save[i].new=new. Otherwise, a data value representing "old" is stored: Save[i].new=old.

Symbol position counter 106 selects a row of the Save table corresponding to the key symbol position currently being processed. Selection enables the values in each column of the selected row to be accessed (read and written to) with bus 920.

The change table 903 keeps information on the last index values assigned for each symbol position to allow "holes" to be made for new keys and to move any records if required. The change table 903 stores the previous symbol, record index and key index values for each symbol position [i] that are need to generate the next key index values for the next new key presented to the associative memory. Change table 903 therefore has three columns, one for the last assigned values of the following variables or data elements: for the record index value, Change[i].record; for the key index value, Change[i].index; and for the symbol value, Change [i].symbol. Like the Save table, the symbol position counter selects the row in the table, enabling entries on that row to be accessed (for reading and writing) by bus 922.

A directory table 923 is also kept. A row of the table is selected with a data value generated by create index values logic 905 and save new index logic 909. This value is notated simply as "sum", as it is a sum of all of the key index values for a key that is being processed. The number of rows in the table equals the number of record locations in record memory 78'. The value "sum" is in fact equivalent to the record index value for the key being processed. Each row of the table has one entry, Change[sum].dir, for each record location in the record memory, sum=1 to P. This entry has one of two values; one representing the location is "assigned" and the other indicating the location is "unassigned". This data structure may be set up in any memory element in the associative memory or host system. It can even be made part of the record memory 78' (FIG. 5).

Coupled between buses 920 and 922 are create index logic 905, change old index logic 907 and save new index logic 909 which permit the logic elements to read and write values to the respective tables. Please note, however, the buses 920 and 922 are merely a functional representation, intended to simplify presentation. The actual data exchange structures between the different elements of add key logic 601 may differ substantially depending on the memory and logic elements selected to implement the data structures of the tables and the logic. For example, when implemented on a specially programmed general purpose digital computer, the data exchange structures will be those of the particular computer chosen.

Save new index logic 909 is further coupled to the write key index table bus 520 so that new index values can be stored in the key index table memory 68', as well as to key symbol buffer for recycling key symbol values.

Figure 10:
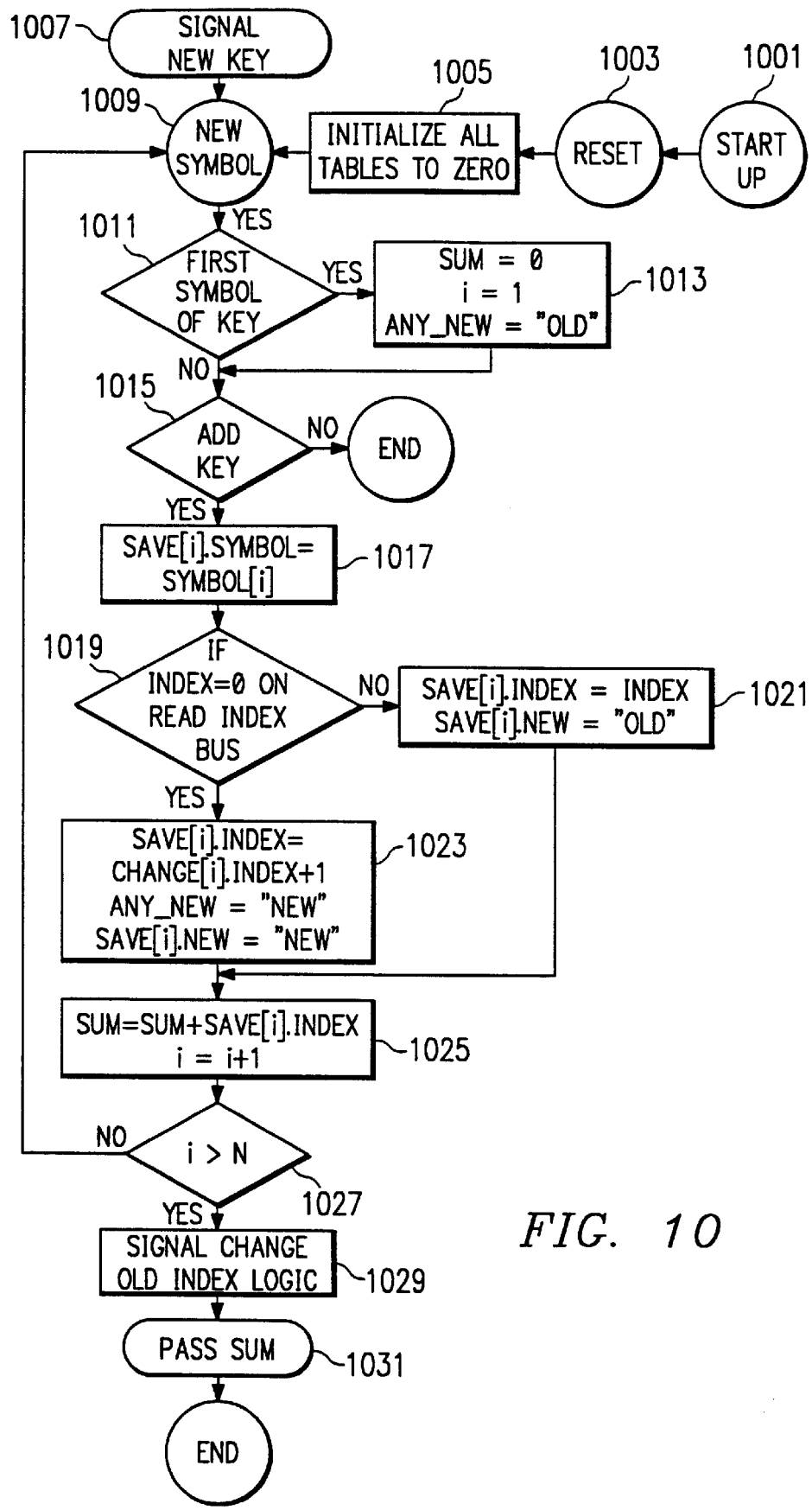
FIG. 10 is a flow diagram describing the operation of a create new index logic component for the add key logic circuit of FIG. 9.

Referring now to FIGS. 9 and 10, illustrated is a flow diagram describing the operation of create index value logic 905. Create index values logic 905 may be implemented with either dedicated circuitry or programmable logic circuitry, possibly shared with the other logic circuits in the associative memory module, or some combination of the two. In the latter case, the steps of the flow diagram would be implemented with programmed instructions.

At start-up of the associative memory, as indicated by circle 1001, all logic components are reset at step 1003, and all tables initialized to zero (written with all zero values) at step 1005. Step 1005 includes setting Index[i,Symbol[i]] to zero, for all i and Symbol[i]. When the host system presents a new key for addition or encoding into key index table memory 68' (FIG. 5), it signals at step 1007 that a new key is being presented on key symbol bus 501 (FIG. 5) and the create new index value process begins. Step 1009, (FIG. 9) indicates when each symbol within the key is presented for processing as indicated by the symbol count being greater than zero. When a symbol is presented, the create new index value process continues to decision step 1011. If the new symbol is the first symbol of the key, then Sum is set equal to zero and i equals one. Further, a variable Any_New is set equal to "old". Any_New is subsequently set to "new" if any Save[i].new="new" from i=1 to N. In other words, "new" is entered in the new column 919 for any symbol position in the Save table; otherwise it is "old". Any_New is a flag which indicates that one or more of the Save [i].new values is set to "new".

At decision block 1015, if the key being presented to the associative memory is to be added, as indicated by the Add command signal on line 517 (FIG. 6) being turned on, create index logic performs the steps outlined in block 1017. If the key is not being added, the created index value process ends. The process steps of block 1017 involve setting the Save table entry Save[i].symbol equal to the symbol value Symbol[i] from the key symbol buffer 104 (FIG. 6).

Create index value logic next reads, as indicated by decision block 1019, the index value, Index[i.Symbol[i]], from the read index bus 505 (FIG. 5), and if it is equal to zero, proceeds to the process steps of block 1023. These steps include setting Save[i].index=Change[i].index+1; Any_New="new"; and Save[i].new="new". Otherwise, the steps of block 1021 are undertaken: setting Save[i].index= Index[i,Symbol[i]]; and Save[i].new="old".

After either the steps of block 1019 or block 1021 are performed, as the case may, the value assigned to the variable Sum is updated to Sum=Sum+Save[i].index at block 1025, and i is incremented by one, i=i +1. If i is less the N, the number of symbols in a key, then the steps indicated by blocks 1011 to 1025 are repeated. Once i=N, then create index value logic signals change old index logic 907 (FIG. 9) and passes the current value for Sum, as represented by blocks 1029 and 1031. The process of create index logic then ends until a new key is presented.

Figure 11:
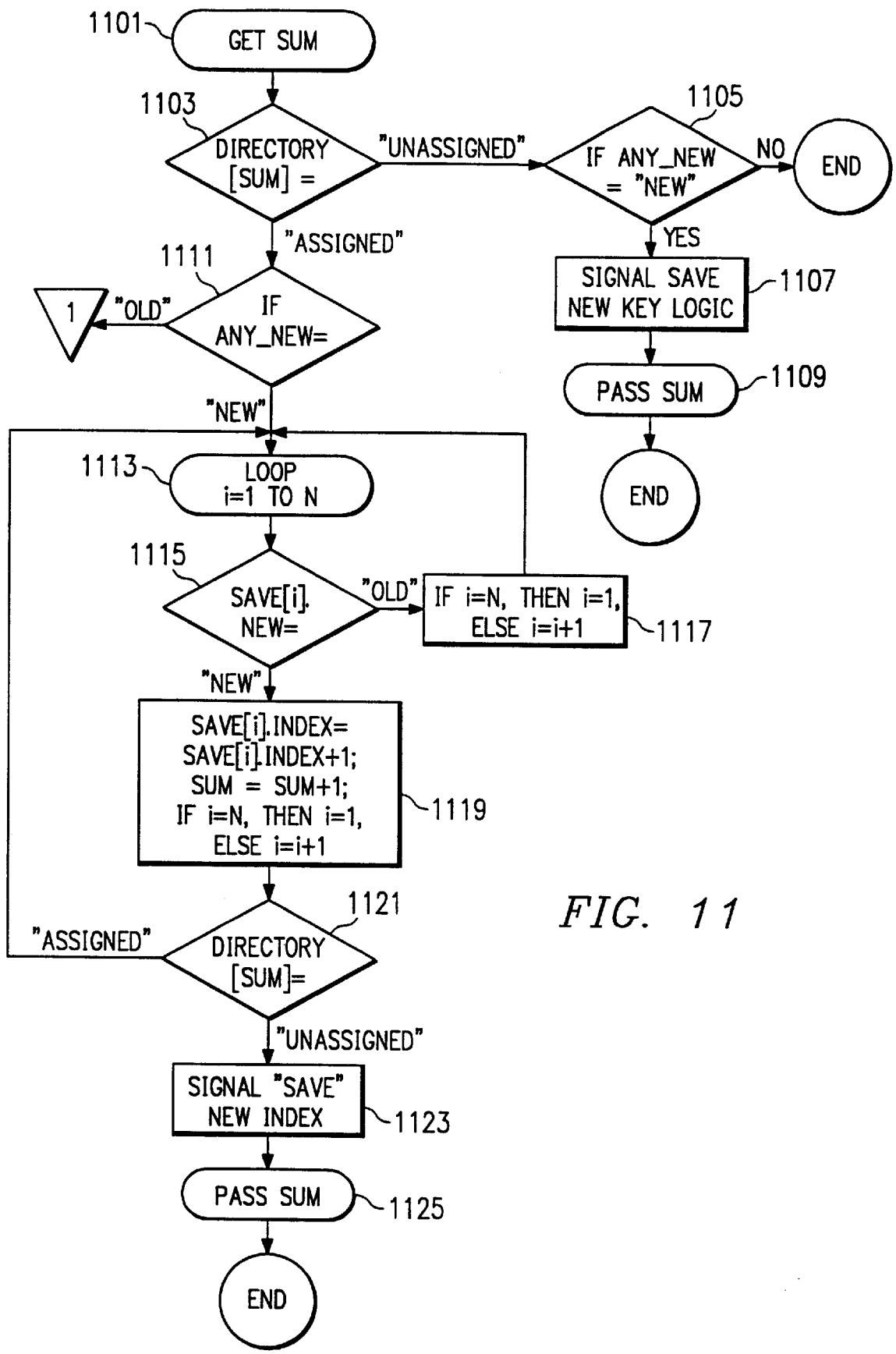
FIG. 11 is a flow diagram describing the operation of a change old index value component of the add key logic of FIG. 9.

Referring now to FIGS. 9 and 11, if the sum of the record index values is a record index value addressing a location in record memory 78' (FIG. 5) already having a key assigned to it, then this new key cannot be entered until either the previous key is moved to a new location or the new key's sum is increased until an unassigned location is found. Either of these moves are accomplished by increasing the value of an index value assigned to some previous key and also used by the new key being processed or increasing the value of an index newly assigned to this key.

First, change old index logic 907 checks to see if the sum of the Index values for the new key, the sum of Index[i, Symbol[i]] from i=1 to N has been assigned. To do this, change old index value logic gets the value for Sum for create index logic 905 on bus 922. As indicated by decision block 1103, change old index value logic selects from the directory table 923 using the select line 925 the value for Directory[sum], which then reads this value out onto bus 922 for retrieval by change old index logic. If Directory [sum] equals "unassigned", this indicates that the index values for the new key sum to a record index that has not previously been assigned to a key. Change old index logic then determines whether Any_New="new", as indicated by decision block 1105. If Any_New="old", the process ends. If Any_New="new", then save new key logic 909 is signalled to begin and the value for the variable Sum passed to it, as indicated by blocks 1107 and 1109, and the process carried out by change old index logic ends.

If, on the other hand, Directory[sum] is assigned, the process of change old index logic continues at decision block 1111. If Any_New="old", a previously assigned index value must be increased to make a "hole" for the new key. The process proceeds to the steps shown in FIG. 12, which are discussed in connection with that figure.

Otherwise, if Any_New="new", indicating that one of the index values for the current key was newly assigned or created by create index value, this new index value is incremented by one, thereby incrementing Sum until an "unassigned" location in the Directory table, Directory[sum] ="unassigned", is found. An "unassigned" value indicates that the that a record memory location addressed by the a record index value equaling Sum has not been assigned to a key and is available for storing a record associated with the new key.

The steps for increasing the newly assigned index value are carried out by a loop shown between blocks 1113 to 1121, the loop being repeated for each symbol position i from i=1 to N, as indicated by block 1113. First, the value of Save[i].new is tested for whether it is "new" or "old", as shown by block 1115. If it is "old", the process moves to the step of block 1117, where i is incremented by 1 or, if i=N, is set equal to 1, and the loop restarts by returning to block 1113. If Save[i].new="new", the process moves to steps shown by block 1119. There, Save[i].index and Sum are incremented by one, and i is also incremented by 1 unless i=N, then it is set equal to 1. The incremented Sum value must be tested to see if it has been assigned; as shown in block 1121, whether Directory[Sum]="assigned". If it has been "assigned", the loop must continue at block 1113. If unassigned, the new index value is saved by signalling save new index value logic 909 and passing the Sum value on line 926, as indicated by blocks 1123 and 1125.

Figure 12:
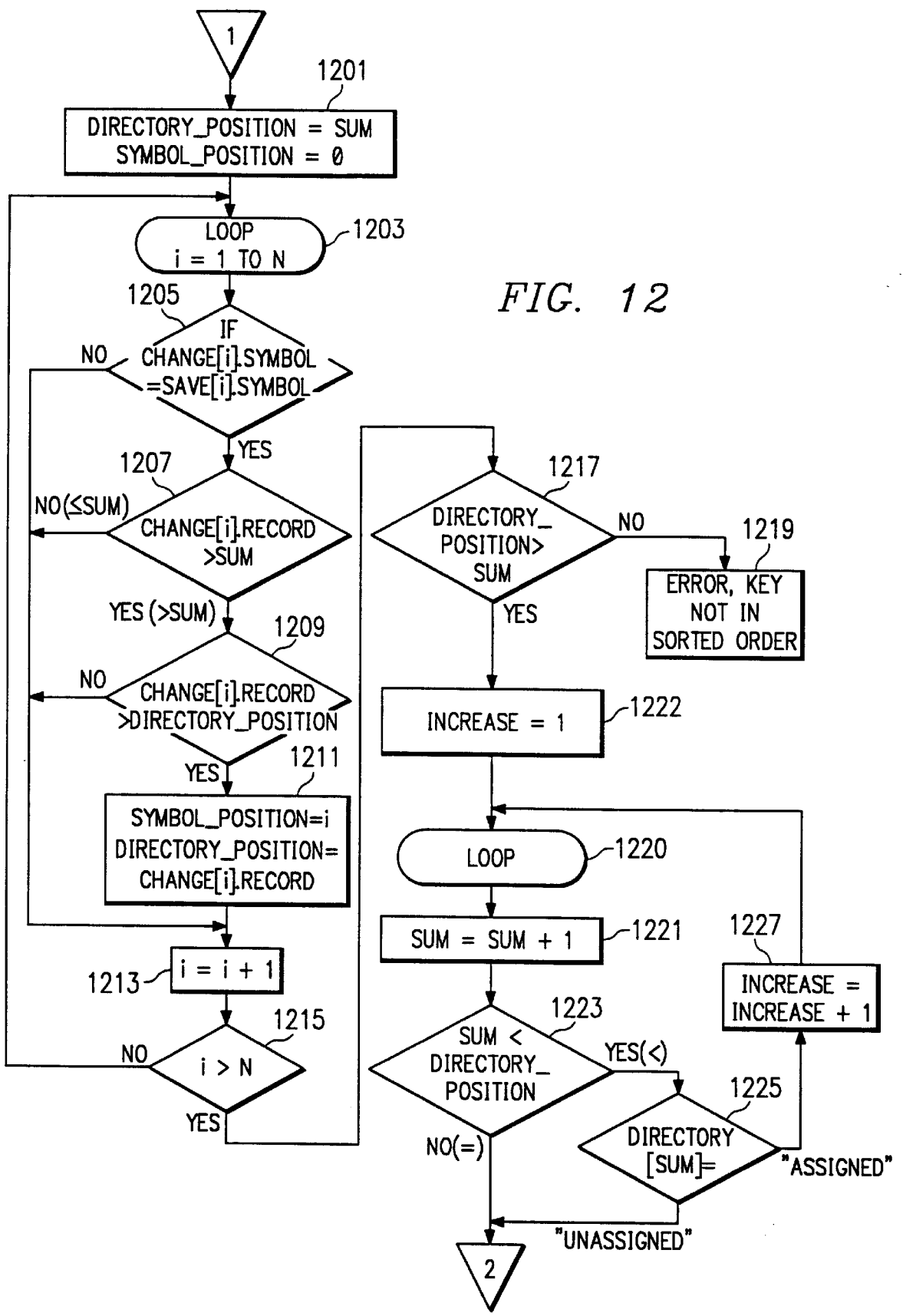
FIG. 12 is a continuation of the flow diagram of FIG. 11 describing the operation of add the change old index value component.

Referring now to FIGS. 9 and 12, where Directory[Sum] ="assigned" and Any_New="old" at steps 1103 and 1111 in FIG. 11, the processes of change old index logic 907 carry on by increasing a previously assigned index value in order to make a "hole" in the record memory for the record associated with the new key. Three additional variables are required to continue the change old index value process. Directory_Position is a pointer to the Directory table 923 that will point to the record memory location at which the hole is made. Symbol_Position keeps track of the symbol position of the index value which will be increased to make a hole. As indicated by block 1201, Directory_Position is initially set equal to Sum, and Symbol_Position is set equal to 0.

Starting with block 1203, a loop begins that is designed to find an index value in the change table 903 that was previously assigned to one of the symbols of the key currently being processed. To do this, the loop begins at i=1 and compares Change[i].Symbol in the change table and Save[i].symbol in the save table to see if Change[i].Symbol= Save[i].Symbol, as shown in block 1205. Where Change[i] .Symbol=Save[i].Symbol, two other conditions are tested. First, Change[i].record, the record index value or Sum at the time the Symbol[i] was assigned, is compared against the current Sum, as shown in block 1207. Second, it is compared with Directory_Position, as shown by block 1209. If Change[i].Symbol is greater than both, then: in block 1211, Symbol_Position is set equal to i and Directory_Position is set equal to Change[i].Record; and, in block 1213 and decision block 1215, i is incremented by one and the loop repeated until i=N. Otherwise, the steps of block 1211 are not performed and the loop repeated for i=i+1 until i=N. In effect, this loop is not only trying to find an index value in the save table having a symbol shared by the current or new key, it also finds, where there is more than one such symbol, the index value that, when assigned, had the largest record index value. The Directory_Position variable keeps track of the largest record index value found as the loop is performed.

At the termination of this loop, change old index logic tests, at decision block 1217, whether the final value for Directory_Position is greater than Sum. If not, then this new key was not in a sorted order with respect to previously presented keys and an error message is flashed to the host system, as indicated by block 1219. Otherwise, it continues to another loop, starting with by block 1220.

Before beginning this loop, a variable Increase is set equal to 1, as shown in block 1222. The value of increase is the number by which the records in the record memory must be moved to create the "hole". The first step in the loop is to increase Sum by one, as shown in block 1221. Next, at block 1223, Sum is compared against Directory_Position. If it is less than Directory_Position, Directory[Sum] is looked up in the Directory table 923 to see if that record index has been assigned, as indicated by decision block 1225. If it is assigned, one is added to the value of Increase, as shown in block 1227. The loop repeated until Sum is either equal to Directory_Position or Directory[Sum] is "unassigned".

Figure 13:
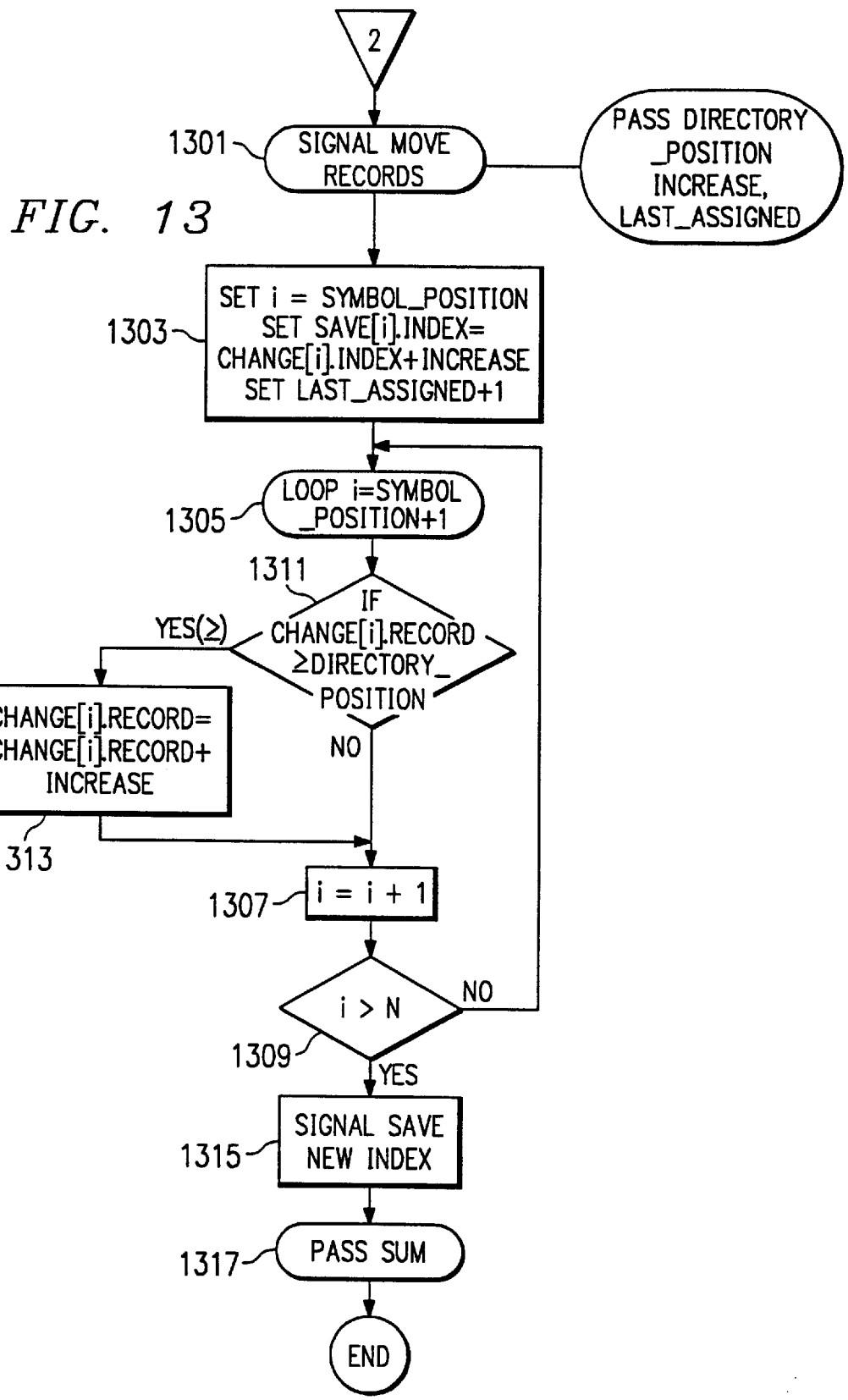
FIG. 13 is a continuation of the flow diagram of FIG. 12.
Figure 14:
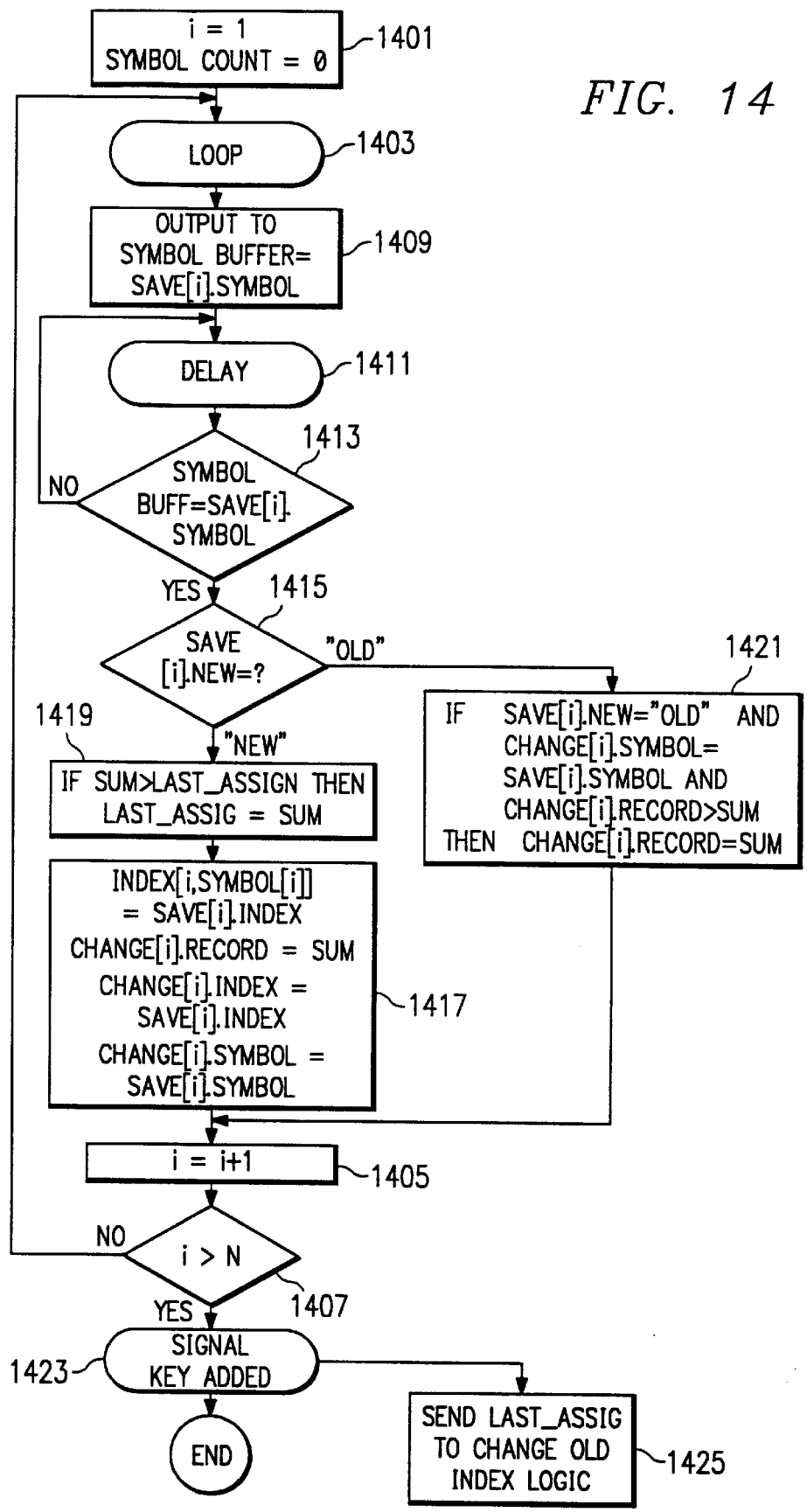
FIG. 14 is a flow diagram describing the operation of a save new index logic component of the add key logic of FIG. 9.

Referring now to FIG. 13, once the processes of FIG. 12 are complete, change old index logic then signals store record logic 94' (FIG. 5), as indicated by block 1301, and passes to stored record logic the values for Directory_Position, Increase and Last_Assigned (a value is assigned to this variable by save new index logic as shown in FIG. 14). Store index logic utilizes these values to move a block of records within the record memory 78' (FIG. 5) addressed by record index values between Directory_Position and Last_Assigned to new a new block of locations addressed by record index values from Directory_Position+Increase to Last_Assign+Increase, thereby making the "hole" in the record memory for storing the record associated with the new key.

Change old index value logic then updates the Save table and the Last_Assigned variable. "i" is set equal to Symbol_Position, and Save[i].Index=Change[i].Index+Increase, Save[i].New="new", and Last_Assigned=Last_Assigned+Increase, all as shown in block 1303. Then, as indicated by blocks 1305, 1307, and 1309, a loop is performed for each i beginning with i=Symbol_Position+1 and continuing to i>N to update the Change table to reflect the movement of the records in the record memory by store record logic, particularly Change[i].Record. To do this, the loop tests Change[i].Record, as shown in block 1311, to see if it is greater or equal to Directory_Position. If so, the step of block 1313 is performed, setting Change[i].Record=Change[i].Record+Increase.

After completion of the loop at block 1309, change old index value logic signals save new index value logic on line 926 and passes Sum, as shown by blocks 1315 and 1317.

Referring now to FIGS. 9 and 14, processes of save new index logic 909 begin with block 1401, in which i=1 and Symbol_Count=0. The remaining process steps are part of a loop that is set up by steps shown in blocks 1403, 1405 and 1407 and repeated for each i, from i=1 to N. The loop therefore essentially sequences through each symbol position in the Save table 901. For each symbol position, it reads the symbol value, Save[i].Symbol, from the Save table and writes it to symbol buffer 104 using bus 929, as described in block 1409. Writing the symbol value to the symbol buffer 104 also strobes the symbol counter 104, as indicated by line 931. After a delay, indicated by block 1411, the value in symbol buffer 104 is tested against the value of Save[i].Symbol to ensure that the value of Save[i].Symbol has been placed in the symbol buffer, as shown in block 1413.

If, as indicated by decision block 1415, the symbol position i has a new index value, Save[i].new="new", then the new index value is stored in the index memory 68' (FIG. 5) by simply writing it write index bus 520 (the symbol counter and symbol buffer already are set to select the correct symbol position and value entry). The new index value is also stored in the Change table 903. Save new index logic further stores the symbol value and Sum, the sum of the index values, in the change table. These steps are shown in block 1417, and described as: Index[i,Symbol[i]]=Save[i].Index; Change[i].Record=Sum; Change[i].Index=Save[i].Index; and Change[i].Symbol=Save[i].Symbol. The variable Last_Assign is also set equal to Sum, as indicated in block 1419, but only if Sum is greater than Last_Assign. Otherwise, it remains unchanged.

If Save[i].new="old", then the steps of block 1417 are not performed, as there are no new index values that need to be updated. As shown in step 1421, only Change[i].Record needs to be updated by setting it equal to Sum, but only if Change[i].Symbol=Save[i].Symbol and Change[i].Record>Sum.

When i>N, the processes of save new index logic 909 exit the loop and signal the host system that the new key has been added, as indicated by block 1423. The value of variable Last_Assigned is passed to change old index logic 907 on line 927, as indicated by block 1425. This then completes the processes for adding a key according to a third method for keys presented in sorted order to the associative memory module 500 for adding. Further keys are added in the same manner.

Only the preferred embodiments of the invention have been described. It should be understood that the invention is not limited to the embodiments disclosed, but is intended to embrace any alternatives, modifications, rearrangements, or substitutions of parts or elements as fall within the spirit and scope of the invention.

What I claim is:

1. In a communication system having a plurality of data networks interconnected for communicating packets of data, each packet containing a source address of a sender, a data packet and a destination address of a receiver for the data packet, a method comprising:

at a media access controller for interconnecting one data network of a plurality of data networks to at least a second data network of the plurality of data networks, receiving a data packet from the second data network;

examining the data packet for a source address contained in the data packet;

looking up, in a directory table stored at the controller, the source address for obtaining source filtering information relating to the source, the step of looking up comprising the steps of, arithmetically coding, according to a predetermined model, the source address as a numerical value uniquely identifying a record of data containing source filtering information for the source address, and accessing the record of data identified by the numerical value for retrieving the source filtering information associated with the source address; and determining whether or not any nodes of the first data network which are connected to the controller are protected from receiving the data packet from the source.

2. The method of claim 1 wherein:

the source address includes a plurality of symbols, each symbol occupying a symbol position; and the step of looking up the source address in the directory table includes the steps of:

looking up a preassigned index value for each symbol based on the symbol's value and position, combining the index values according to a predetermined arithmetic operation to generate a numerical value associated with the source address, and accessing the record of data identified by the numerical value for retrieving the source filtering information associated with the source address.

3. In a communication system comprised of a plurality of data networks interconnected for communicating packets of data, a routing method comprising:

receiving a data packet at a node connecting at least a first one of the plurality of data networks to a second one of the plurality of data networks, the data packet including a physical address for identifying a device to which the data packet is to be routed and a first logical address for identifying a sender of the data packet independent of the sender's physical address;

examining the data packet for the first logical addresses;

looking up, in a directory table stored at the node, source filtering information associated with the first logical address; and filtering the data packet in response to the source filtering information.

4. The method of claim 3 wherein:

the first logical address includes a plurality of symbols, each symbol occupying a symbol position; and the step of looking up the first logical address in the directory table includes the steps of:

looking up a preassigned index value for each symbol based on the symbol's value and position, combining the index values according to a predetermined arithmetic operation to generate a numerical value associated with the source address, and accessing the record of data identified by the numerical value for retrieving the source filtering information associated with the second logical address.

5. The method of claim 3 the data further includes a second logical address for identifying a recipient of the data pocket independent of the recipient's physical address, and wherein the node routes the data packed in response to looking up routing information associated with the second logical address in a routing table.

6. The method of claim 5 wherein looking up the routing information in the routing table includes:

arithmetically coding the second logical address to a numerical value uniquely identifying a record of data containing the routing information; and accessing the record of data identified by the numerical value for retrieving the routing information.

7. The method of claim 6 wherein:

the second logical address includes a plurality of symbols, each symbol occupying a symbol position; and looking up the routing information stored in the routing table includes the steps of:

looking up a preassigned index value for each symbol based on the symbol's value and position;

combining the index values according to a predetermined arithmetic operation to generate a numerical value associated with the source address, and accessing the record of data identified by the numerical value for retrieving the routing information associated with the first logical address.

8. In a communication system having a plurality of data networks interconnected for communicating packets of data, a controller for interconnecting a first data network of the plurality of data networks to at least a second data network of the plurality of data networks comprising:

means for receiving a data packet, the data packet including a physical media address for identifying a physical device for routing the data packet in physical media and a source address for logically identifying a sender of the data packet independent of the sender's physical media address;

means for looking up in a directory table stored at the controller using the source address source filtering information associated with the source address; and means for filtering the data packet in response to the source filtering information.

9. The controller of claim 8 wherein the means for looking up includes an encoder for arithmetically coding the source address to a unique numerical value for indicating a location in the directory table of the source filtering information associated with the source address.

10. The controller of claim 9 wherein:

the source address includes a plurality of symbols, each symbol having a value and occupying a predetermined symbol position; and the encoder includes, a memory for storing index values assigned to each symbol value and position found in each source address for which there is source filtering information stored in the directory table, and an adder for summing the index values preassigned for each symbol in the source address to generate the unique numerical value for looking up the source information in the directory table.

11. The controller of claim 9 wherein the source address includes a unique, fixed and unchanging code for uniquely identifying the source to each network in the plurality of networks.

12. The controller of claim 8 wherein the data packet includes a destination address for logically identifying a recipient of the data packet independent of the recipient's physical media address, and wherein the controller further includes means for looking up, using the destination address, in a routing table information associated with the destination address for routing the data packet for delivery to the receiver.

13. The controller of claim 12 wherein the means for looking up in the routing table the information for routing includes an encoder for arithmetically coding the destination address to a unique numerical value for looking up the information for routing.

* * * * *

(12) EX PARTE REEXAMINATION CERTIFICATE (10819th)
United States Patent
Fenner

(10) Number: US 5,842,224 C1
(45) Certificate Issued: Feb. 22, 2016

(54) METHOD AND APPARATUS FOR SOURCE FILTERING DATA POCKETS BETWEEN NETWORKS OF DIFFERING MEDIA

(75) Inventor: Peter R. Fenner, Richardson, TX (US)

(73) Assignee: FENNER INVESTMENTS, LTD., Richardson, TX (US)

Reexamination Request:
No. 90/020,064, Dec. 17, 2013

Reexamination Certificate for:
Patent No.: 5,842,224
Issued: Nov. 24, 1998
Appl. No.: 08/269,951
Filed: Jun. 30, 1994

Related U.S. Application Data

(63) Continuation of application No. 07/737,147, filed on Jul. 29, 1991, now abandoned, which is a continuation-in-part of application No. 07/367,012, filed on Jun. 16, 1989, now Pat. No. 5,095,480.

(51) Int. Cl.
*H04L 12/46* (2006.01)
*H03M 7/40* (2006.01)

(52) U.S. Cl.
CPC ......... *H03M 7/4006* (2013.01); *H04L 12/4625* (2013.01)

(58) Field of Classification Search
None
See application file for complete search history.

(56) References Cited

To view the complete listing of prior art documents cited during the proceeding for Reexamination Control Number 90/020,064, please refer to the USPTO's public Patent Application Information Retrieval (PAIR) system under the Display References tab.

*Primary Examiner* — Jalatee Worjloh

(57) ABSTRACT

To provide for fast access times with very large key fields, an associative memory utilizes a location addressable memory and look up tables to generate from a key an address in memory storing an associated record. The look up tables, stored in a memory, are constructed with the aid of arithmetic data compression methods to create a near perfect hashing of the keys. For encoding into the look up table, keys are divided into a string of symbols. Each symbol is assigned an index value, such that a modulo sum of index values for symbols of a particular key is a unique value that is used as an address to the memory storing the record associated with that key.

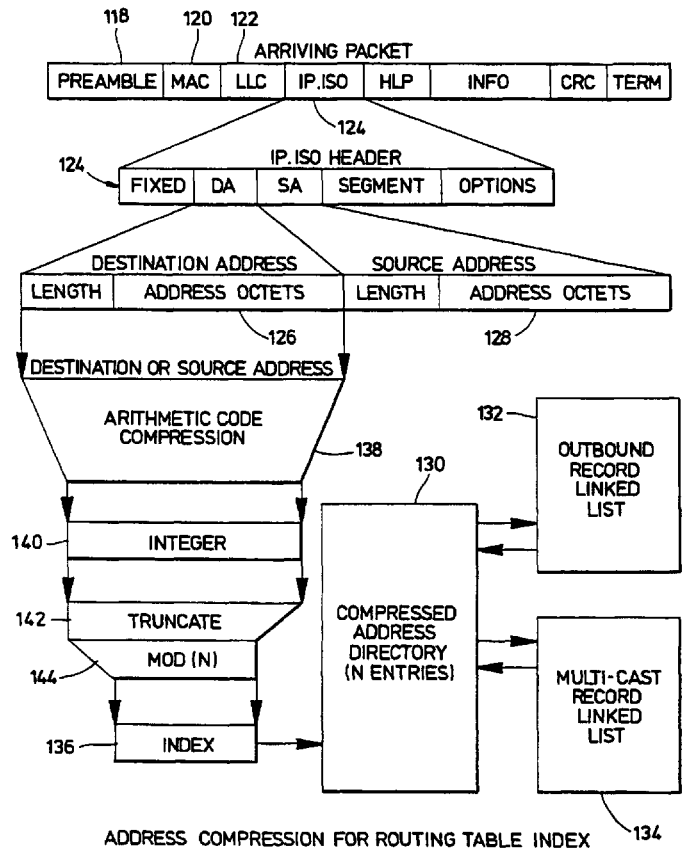

ADDRESS COMPRESSION FOR ROUTING TABLE INDEX

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 3 and 5 is confirmed.

Claims 1, 2, 4 and 6-13 were not reexamined.

\* \* \* \* \*